Patented Sept. 27, 1938

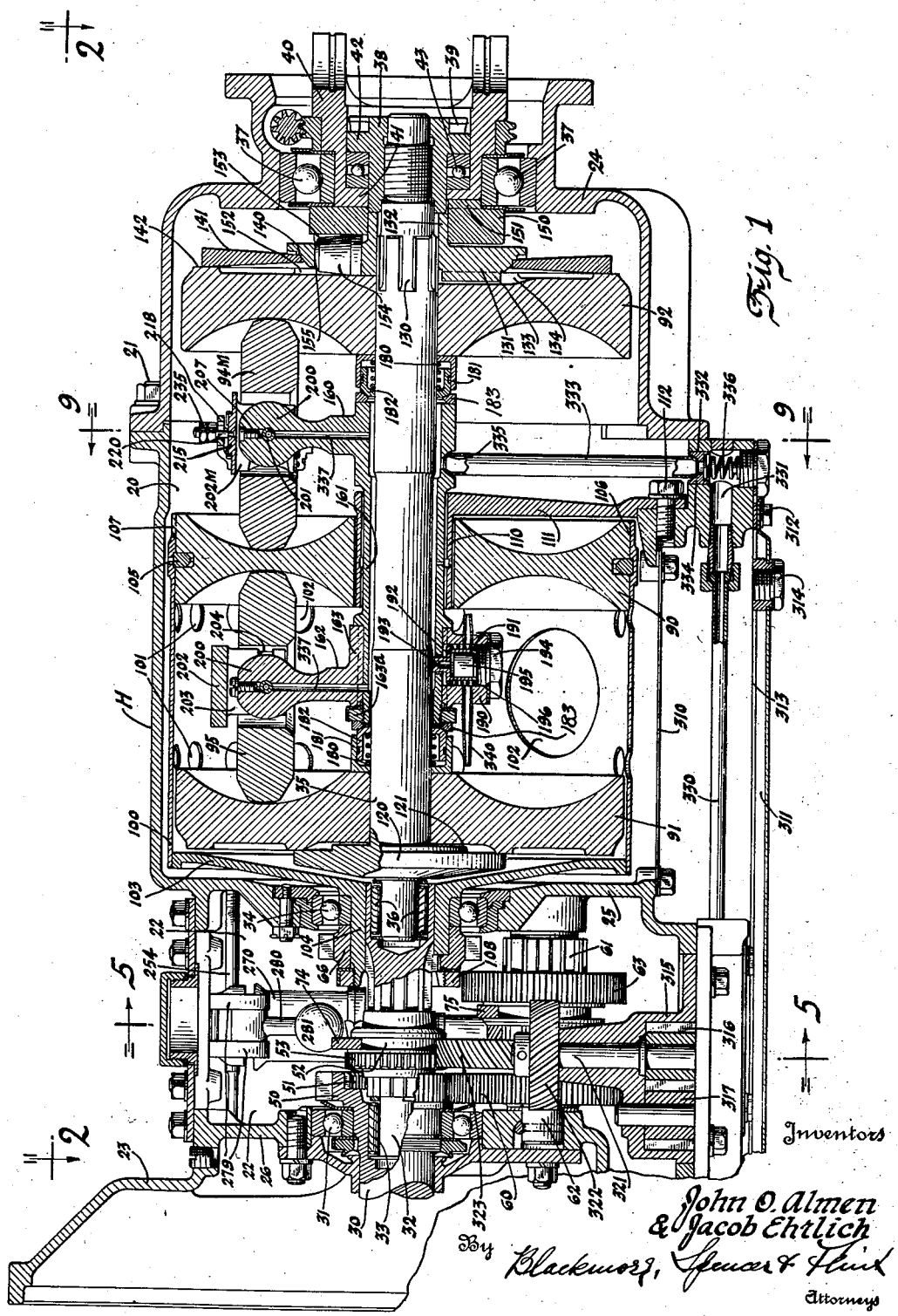

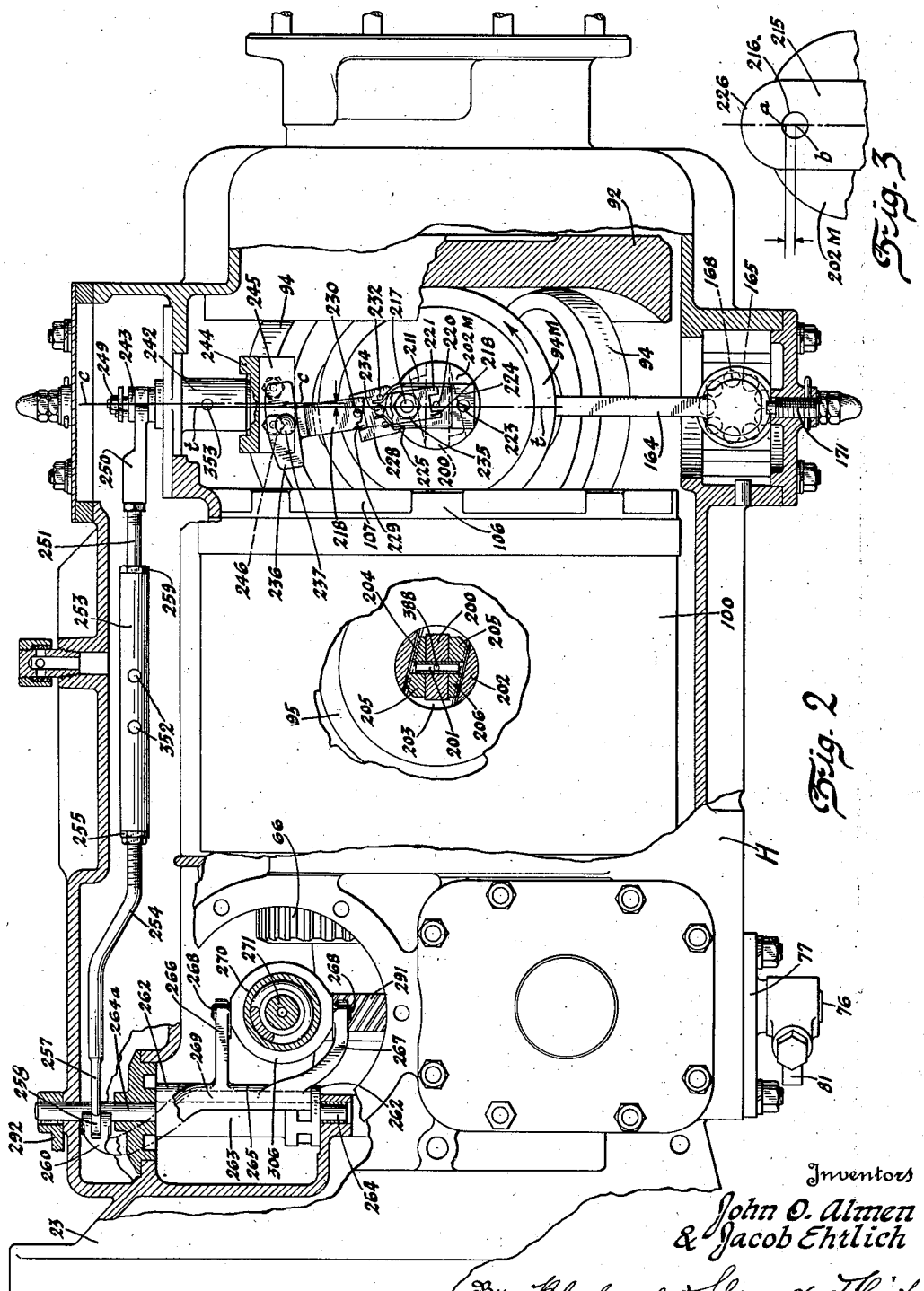

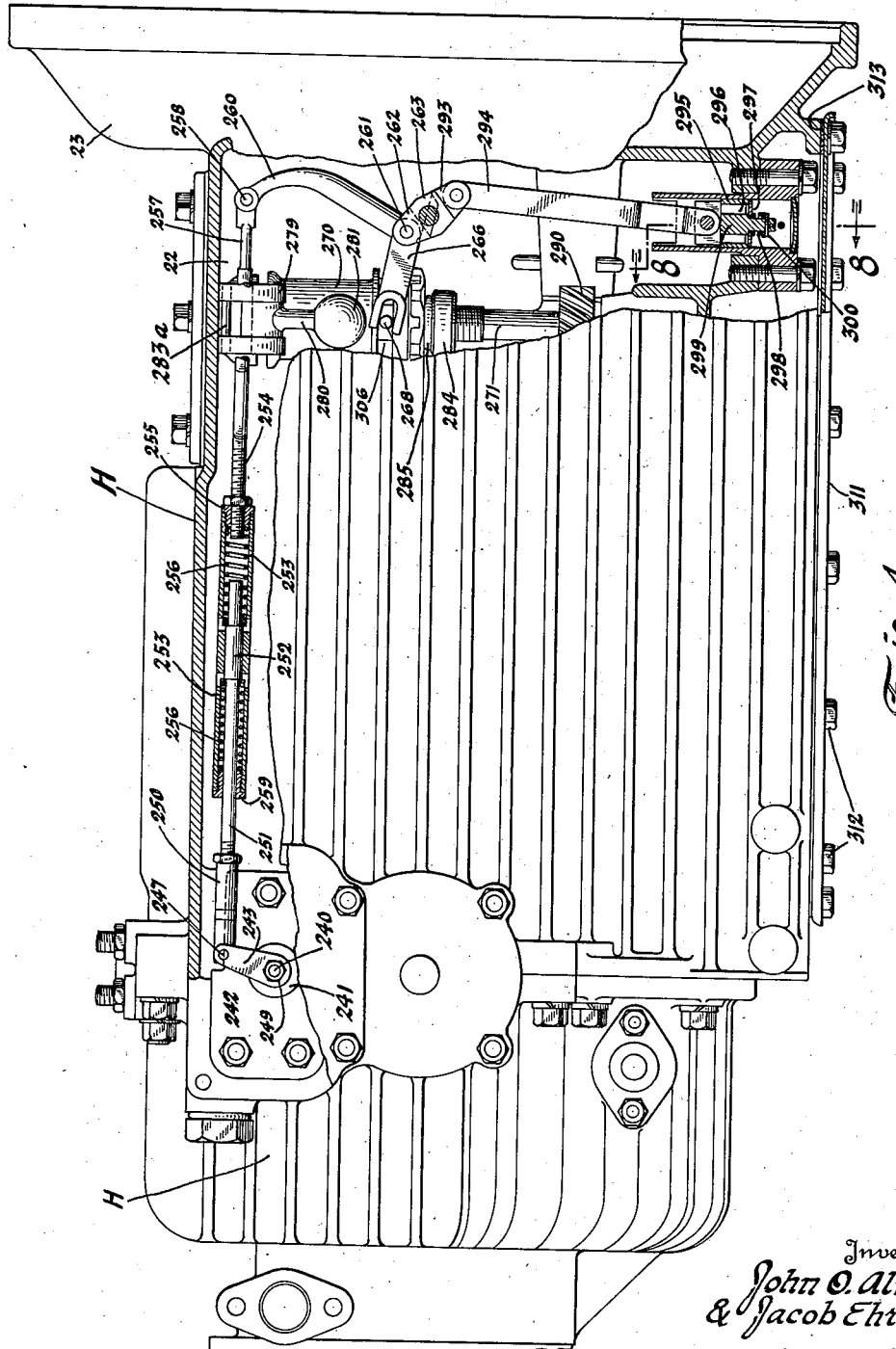

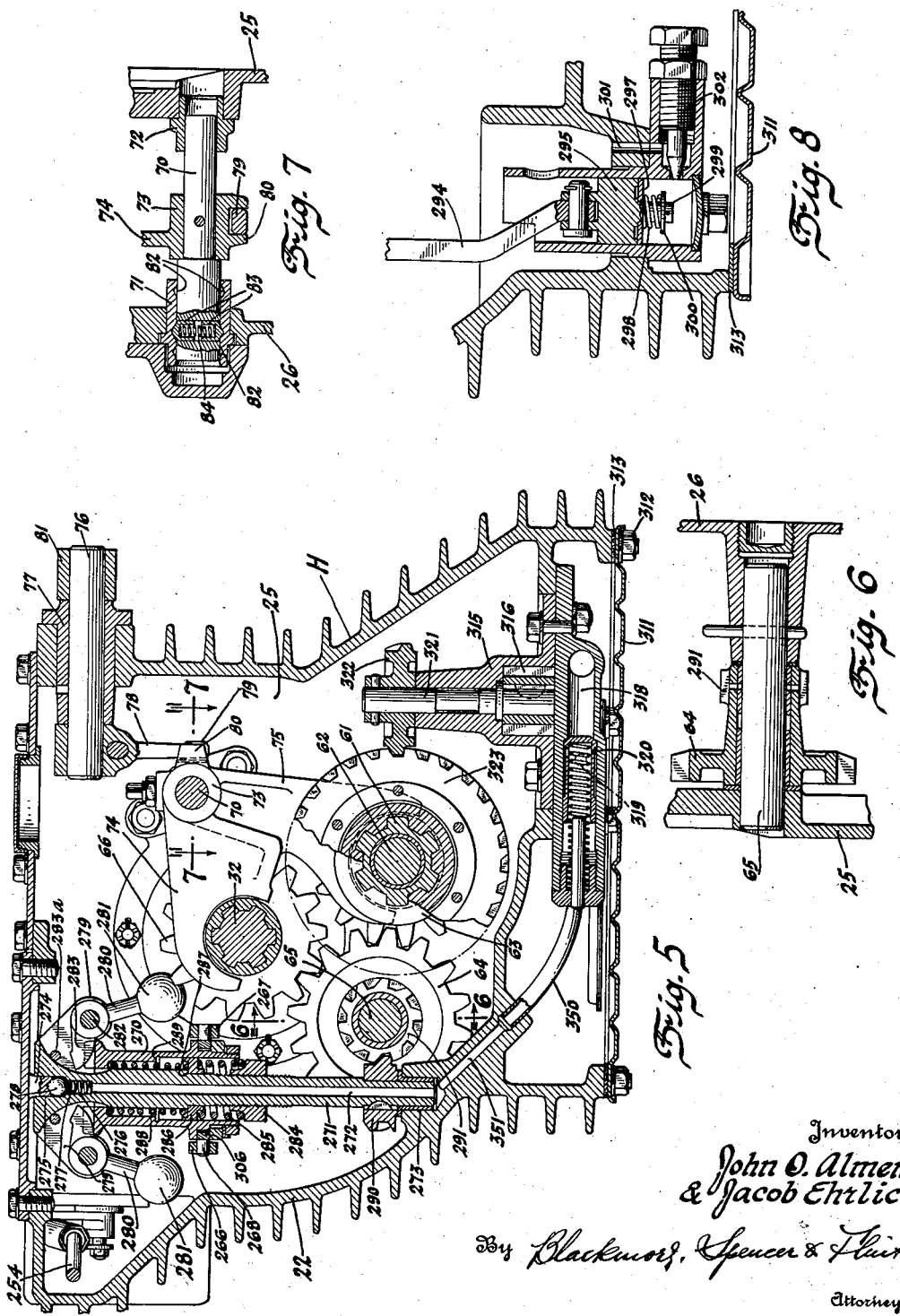

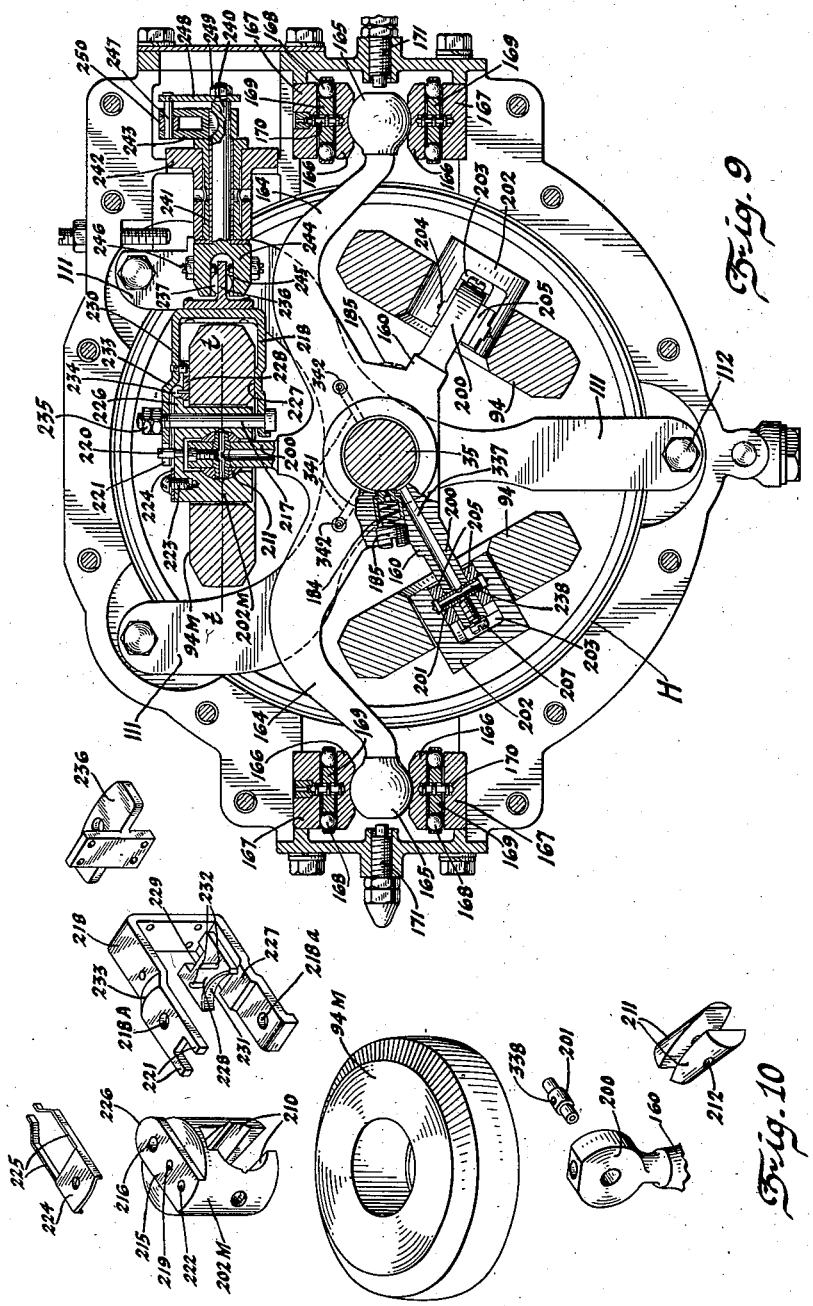

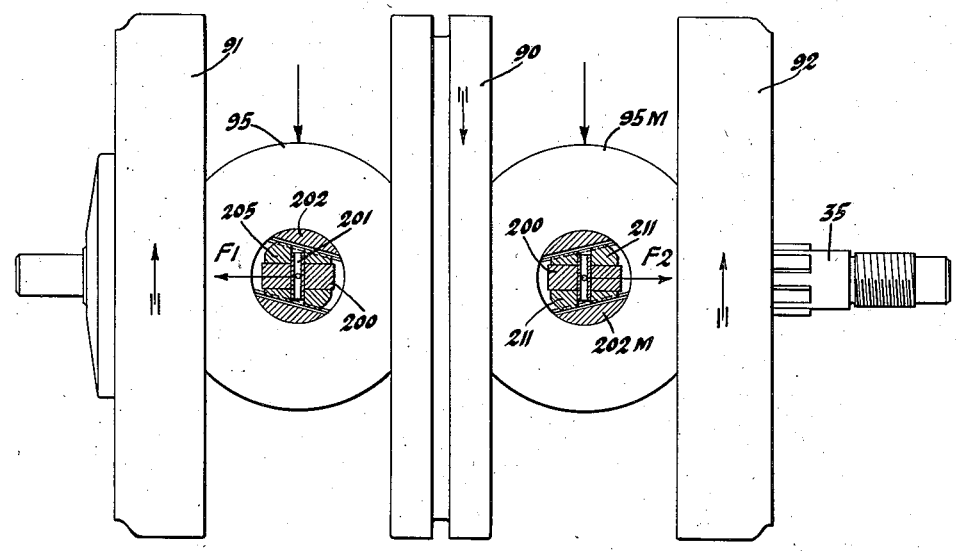
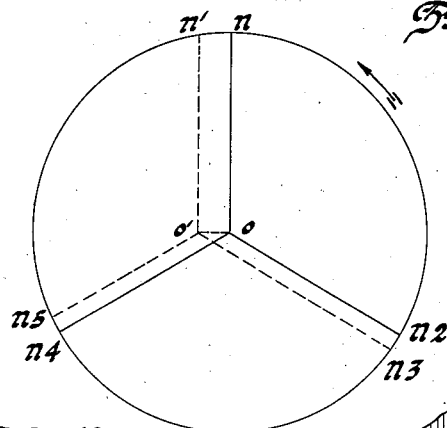
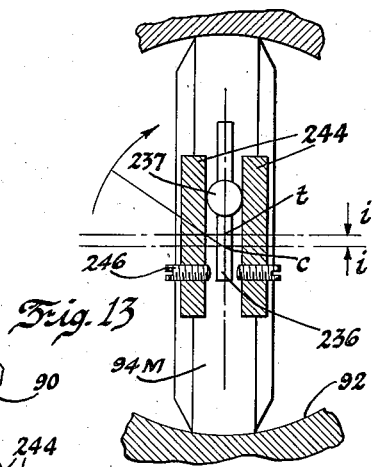
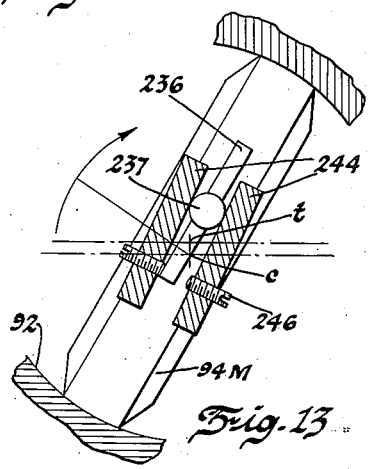
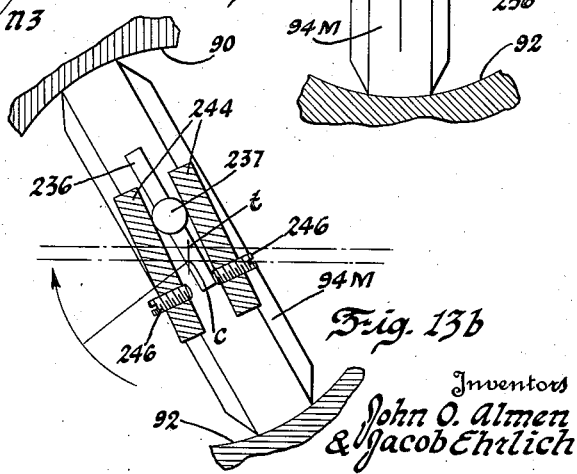

2,131,158

UNITED STATES PATENT OFFICE 2,131,158

CONTINUOUSLY VARIABLE TRANSMISSION

John O. Almen, Royal Oak, and Jacob Ehrlich, Detroit, Mich., assignors, by mesne assignments, to General Motors Corporation, Detroit, Mich., a corporation of Delaware Application February 3, 1932, Serial No. 590,534

59 Claims. (Cl. 74—190.5)

This invention relates to variable speed ratio transmission mechanism, comprising a plurality of races having toroidal raceways and interposed friction rollers, particularly designed to be installed in a motor vehicle to transmit the power of an internal combustion engine to the traction wheels.

Objects of the invention are, in general, to improve the performance of friction transmission mechanisms and to achieve accuracy and ease of control, specifically attained in part by:

(1) Facilitating changing the direction of rotation of the power output shaft of the transmission with respect to that of the power input shaft therefor in changing from forward to reverse drive, and, incidentally, placing the transmission in neutral, that is disconnecting both forward and reverse drive trains without otherwise disengaging the engine from the transmission;

(2) Adjusting the degree of tractive pressure between races and interposed rollers in accordance with the load upon the output shaft without angularly displacing the races keyed to the output shaft relatively to one another or to the shaft;

(3) Controlling the speed ratio by externally derived ratio-changing effort imparted to one only of the intermediate transmission rollers (a control or master roller), thereby easing materially the control effort compared with that required if applied to all of the intermediate rollers, and avoiding the necessity of using servo mechanism to effect ratio change;

(4) Utilizing the torque forces mutually exerted between races and intermediate friction rollers to equalize the torque transmitted by the several rollers, and, as a corollary, causing all of the rollers to assume equivalent ratio positions in response to said torque forces after one (the master roller) has been forced out of its normal plane of rotation and its axis displaced from the radial plane that includes the main axis of the transmission and the roller center by an external effort of control;

(5) Causing automatic displacement of the rollers, other than the master roller, in their normal planes of rotation so as to displace their axis of rotation in response to ratio changing or tilting movement of the master roller in order that the torque forces acting mutually during rotation on the races and said other rollers may cause all rollers to assume a corresponding ratio or tilt position;

(6) Inclining the master roller, by force applied thereto radially outward of its perimeter, about a line connecting its points of contact with the races in order to displace its axis out of the radial plane including the main axis and roller center for initiating change of ratio or tilt position;

(7) Causing the master roller in tilting or changing its paths of contact with toroidal raceways automatically to assume a position in which its axis of rotation is restored to said radial plane after it has been displaced from said plane by inclining the roller;

(8) Automatically adjusting the connections between the master roller and the external control means so that the ratio changing effect of external force applied to the controlled roller will be the same for both forward and reverse drives;

(9) Limiting the ratio changing rate of all rollers by limiting the extent of inclination that can be imparted to the master roller in a given time;

(10) Varying the permissible rate of ratio changing or tilting movement of the friction rollers in accordance with the ratio or tilt position thereof at time of application of ratio changing effort;

(11) Automatically governing the transmission ratio in accordance with the speed of the power input shaft of the friction transmission mechanism;

(12) Starting circulation of the lubricating oil immediately when the engine is started, transmission power input shaft coupled thereto, and transmission in neutral, to the end that the friction transmission elements may be well lubricated prior to starting the car.

The aforesaid objects, and others, are attained by means of the combination of a friction-transmission unit with a selective gear transmission unit arranged in series within a housing, the selective gear unit being disposed between the friction unit and the source of power, as hereinafter described and illustrated in the attached drawings; and by means of the several combinations of elements, sub-combinations, and details of construction and arrangements to be specifically described.

The friction transmission unit comprises, generically, an output shaft having a race with toroidal raceways keyed to each end, a race with opposite toroidal raceways intermediate said end races coaxial with said output shaft but supported independently of it on a shaft-surrounding bearing fixed to the housing, and intermediate friction rollers in tractive engagement with the raceways.

The selective gear transmission unit comprises, generically, an input shaft in axial alinement with said output shaft to which said intermediate race is coupled, countershaft, forward and reverse drive trains, and selective controls whereby the transmission may be coupled to the engine to transmit drive in forward or reverse, or may be adjusted to a neutral condition so that no power is transmitted therethru.

Within the housing, associated with the selective gear unit, are disposed a governor, driven only when the car is in motion, adapted to control the speed-ratio of the friction unit, and a lubricating pump adapted to start circulation of lubricating oil prior to starting the car.

Associated with the friction unit are spring and torque loading devices adapted to apply pressure to the races in such manner as to secure tractive engagement of the rollers therewith in accordance with the load, wherein a power transmitting coupling on the delivery end of the output shaft has a lost motion driving connection thereto and is associated with wedging or camming devices operative to translate any angular movement of the coupling into an axial movement of an adjacent race.

The intermediate friction rollers are positioned and supported by spider arms fixed to a floating tube which surrounds the output shaft and may float laterally and axially in response to unbalanced torque forces applied between rollers and races. The floating sleeve is centered by spring devices and its movements are damped by dash pots supplied with oil from the lubricating system.

The ends of the roller positioning spider arms and the bearings of said rollers have mutually reacting devices in the form of inclined planes whereby movements of the floating tube caused by inequalities of torque load upon the several rollers tend to effect a readjustment of the rollers in such manner as to equalize the loads. One of the rollers is so mounted as to be steered to new ratio or tilt positions by rocking or inclining it about an axis joining its points of contact with the races. This roller is herein termed the control or master roller and it may be inclined by externally applied effort, whether it is rotating in one sense or the opposite, thru a control yoke which assumes different angular positions with respect to a plane normal to the race axis including the roller center in accordance with the sense of rotation. The other rollers are automatically displaced by a translatory movement in their planes of rotation so that their axes are displaced from a radial plane including the main axis and the roller center, in order that the inherent torque forces exerted during rotation may cause suitable readjustment of ratio position.

Said control yoke, which is pivoted to the master roller trunnion and has a friction bearing upon one or both faces of the master roller is thereby urged to swing to one side or the other of a plane normal to the race axis including the roller center to a limited extent, according to the direction of rotation of the roller, whereby pressure properly applied to the outer extremity of the yoke will so incline the roller and displace its axis of rotation that, as it tilts to a new ratio position, the axis of rotation will be returned to the radial plane in which it normally lies.

External force is applied to the master roller for ratio changing purpose thru a T shaped rock lever having a slot in the T head or cross arms arranged to engage said automatically adjustable control yoke in either of its adjusted positions so that the same directions of movement imparted externally to the rock lever will adjust the inclination of the master roller to cause increase or decrease of speed-ratio by the same movements whether the transmission be coupled in forward or reverse gear.

The axis of said rock lever is parallel with and displaced slightly with respect to a line passing thru the center of the roller, normal to a plane that includes the race axis and the roller center. The end of the control yoke consists of a parallel sided platen having centrally disposed rounded bearings projecting from opposite sides, the distance from bearing point to bearing point thru the platen being equal to the width of the slot in the head, thus providing clearance space between the rest of the platen and the opposite sides of the slot in the lever. This disposition of the axis of the rock lever thus provides for variation of degree of inclination imparted to the roller in different ratio or tilt positions by a rocking movement of the lever.

Other features embodied in the invention are specifically set forth hereinafter.

It will be understood that in friction transmissions of the type herein disclosed power is transmitted in parallel from or to the central race (or races) to or from the end races, drivingly secured to the concentrically disposed power output shaft, thru the two sets of friction rollers in tractive contact with the races. When the plane of rotation of a roller, (that is, the plane normal to the axis of rotation of the roller) passing thru the points of contact of the roller with the races, is perpendicular to a plane including the axis of the races, and the axis of rotation of the roller lies in said plane, the torque forces are in balance and the rollers tend to maintain their normal positions. When the plane of rotation of a roller is parallel with the race axis the ratio is 1:1. When it is tilted or non-parallel with the race axis the ratio is either greater or less than 1:1.

If a roller be inclined, i. e., rocked about an axis joining its points of contact with the races, so as to incline the axis of rotation out of said axial plane the torque forces are unbalanced and the roller thereupon tilts—i. e. changes the angle of its plane of rotation with respect to the main axis. Likewise any movement imparted to a roller that displaces its axis of rotation out of said axial plane brings to bear upon it unbalanced torque forces which cause it to tilt to a different ratio position.

Should the axis of rotation of a roller be displaced out of the axial plane that normally includes it, the roller would tend to spiral on the races until it ran off or its spiraling-movement was checked, unless some means were provided for returning the axis of rotation into said axial plane. The act of bringing back the axis of rotation of a roller to said axial plane after it has once been displaced is herein termed restoration. Means for effecting restoration is hereinafter described.

In the accompanying drawings wherein the same reference characters indicate like parts thruout the several views, Fig. 1 illustrates a vertical longitudinal section thru a housing and enclosed transmission mechanism embodying the invention, as viewed from the left hand side of a vehicle;

Fig. 2 is a plan view of the housing and transmission mechanism disclosed in Fig. 1 viewed in the direction of the arrows 2—2 Fig. 1, parts of the housing having been broken away to expose enclosed mechanisms;

Fig. 3 is a diagram of a fragment of a journal piece for the control roller of the friction set;

Fig. 4 is a view in elevation of the transmission viewed from the right hand side, or side opposite that from which Fig. 1 is viewed, the housing having been broken away in part to expose enclosed mechanism;

Fig. 5 illustrates a transverse section on the planes indicated by the line 5—5 of Fig. 1 exposing the parts that would be seen viewed in the direction of the arrows, that is, rearward;

Fig. 6 is a detail view of a governor driving gearing taken on the plane indicated by line 6—6 of Fig. 5;

Fg. 7 is a detail view of a manually controllable means for coupling the transmission mechanism in the direct or reverse trains at will, taken on line 7—7 of Fig. 5;

Fig. 8 illustrates a section, on the plane indicated by line 8—8 of Fig. 4, thru a means for regulating the speed-ratio changing mechanism;

Fig. 9 illustrates a transverse section on the plane indicated by line 9—9 in Fig. 1, the exposed parts being viewed in the direction of the arrows, that is, in a forward direction;

Fig. 10 is a view of the master or speed-ratio controlling friction roller assembly the parts of the assembly having been disassembled and separated;

Fig. 11 is a diagram showing the relation of the races and intermediate friction rollers and the mountings of the latter on floating spider arms;

Fig. 12 is a diagram illustrative of the mode of operation of the mechanism for automatically equalizing the torque transmitted by the several rollers of one set, and Figs. 13, 13a and 13b are diagrams illustrative of the mode of operation of an externally operated rock lever for inclining the master roller and limiting the degree of inclination that can be imparted to said roller.

A housing, indicated as an entirety in the drawings by reference letter H, encloses and supports the variable speed mechanism of this invention, which is designed to be disposed between an engine and propeller shaft of a motor vehicle. A relatively large compartment 20, houses a shaft connected at its rear end to the propeller shaft, friction driving and driven races, friction power transmitting rollers interposed between the races, supporting means and accessories, which constitute the variable speed-ratio assembly of this transmission. For convenience of assembly of the friction elements and control parts within the compartment 20, the housing may consist of two parts divided in a transverse plane and united end to end, as by bolts 21 penetrating circumferential abutting end flanges provided on the two parts.

A smaller compartment 22 within said housing, disposed in advance of the compartment 20, encloses gearing adapted to be selectively controlled manually to couple the friction transmission to the engine so that the vehicle may be driven forward or rearward. Compartment 22 also encloses an oil pump, with its driving train, and a governor mechanism for controlling automatically the speed-ratio of the friction transmission. The expanded bell-like portion 23 at the front end of the housing is intended to be rigidly secured to the usual bell housing which covers the main friction clutch for coupling and uncoupling an internal combustion engine to or from the transmission, as is usual in motor vehicles. The housing is provided with a rear transverse wall 24, an intermediate partition 25 between compartments 20 and 22, and a forward partition 26 separating compartment 22 from the compartment within bell-like housing member 23. The said partitions and wall support bearings for the main shafting sections. The housing is also provided with removable cover plates suitably located to afford convenient access to the interior of the compartments and the necessary bearing supports for movable parts of the mechanism other than the main shaft sections. Heat dissipating ribs may be formed on the housing and suitable ventilating or breather openings therein.

Referring particularly to Fig. 1,—numeral 30 indicates a prime mover shaft such as the main clutch shaft, usual in motor vehicle transmission mechanism, the front end of which may be provided with one element of the usual main friction clutch (not shown) by which the transmission may be directly coupled to or uncoupled from the engine shaft. The rearward end of main clutch shaft 30 is journaled, preferably in ball bearings 31, in the housing partition 26; it is drilled and counterbored to receive the front end of a shaft 32, piloted, preferably, in roller bearings 33, within the counterbored cavity. The rear end of shaft 32 is journaled, preferably, in ball bearings 34 supported in partition 25 of the housing. The rear end of shaft 32 is drilled and counterbored, like the rear end of main clutch shaft 30, for the purpose of receiving the front end of shaft 35, which is piloted within roller bearings 36 within the counterbored cavity. The rear end of shaft 35 is journaled, thru surrounding interposed parts, preferably within ball bearings 37 supported in the rear wall 24 of housing H. The primary element of the surrounding interposed parts referred to is an externally flanged nut 38 threaded to the shaft and provided with radial spanner-engageable tongues and grooves 39 whereby it may be adjusted. Surrounding the flanged nut 38 is a universal joint yoke 40 adapted to connect shaft 35 with a propeller shaft of any usual type by which the power of the engine may be transmitted to the traction wheels of a vehicle. Yoke 40 has a reduced external cylindrical zone to receive the inner race of the ball bearing 37. At its forward end it is provided with an internal flange 41 bearing upon the external surface of nut 38, while rearward of said internal flange said yoke has bearing upon the external flange 42 of nut 38. A thrust bearing 43 is interposed between said flanges 41 and 42, and said yoke 40 is adapted to rotate a limited extent with respect to shaft 35, all by means to be described and for purposes to be stated hereinafter in its appropriate place. The alined axes of shafts 30, 32 and 35 constitute the main axis of the transmission. Shaft 32 is adapted to be rotated in one sense for forward driving and in the opposite sense for reverse driving by shaft 30; shaft 35 is adapted to be driven by shaft 32 thru intermediate variable speed friction gearing to be described later. The described bearing equipment for shaft 35 is such as to permit slight axial movement of the shaft in the bearings.

Shaft 32, which may be considered the power input shaft of the friction transmission mechanism, is adapted to be directly coupled to the main clutch shaft 30 by means of a manually controllable dog clutch. Shaft 32 is also adapted to be driven by shaft 30 in a reverse direction by means of a reversing gear train which may be coupled by manual effort after releasing the direct forward drive coupling by means and in a manner to be described presently. If shaft 32 be directly coupled to shaft 30, shaft 35, which may be considered the power output shaft of the friction transmission mechanism, will be rotated in a direction to impart forward movement to the vehicle. If shaft 32 be coupled in reverse to shaft 30, shaft 35 will be rotated in a direction to impart rearward movement to the vehicle.

Referring now to Figs. 1 and 5, the direct and reverse trains will be described whereby the shaft 32 may be rotated in either the forward or reverse drive sense according to selective controlling actions of the operator. Rigid with main clutch shaft 30, at its rear end within the compartment 22, is an externally toothed gear 50, the rearward face of which is provided with a cavity bounded circumferentially by a row of internally directed gear-like teeth 51 concentric with the shaft axis, and constituting the socket element of a dog clutch. The plug element of said dog clutch is an element 52 splined to slide but not rotate on the shaft 32. Element 52 is provided with external gear-like teeth 53 adapted to interlock with said internal teeth 51. When teeth 51 and 53 are interlocked, shaft 32 must rotate in unison with shaft 30 at the same speed and in the same direction. This is the condition of the transmission mechanism when coupled for forward driving. The external teeth of gear 50 are in constant mesh with the teeth of a gear 60 which is mounted rigidly (in this embodiment) on an externally splined sleeve 61 rotatable on a shaft 62 the ends of which are secured in suitable seats in the partitions 25 and 26. A reverse train gear 63 is slidably mounted on sleeve 61 so as to be compelled to rotate with it. The teeth of gear 63 are adapted to be engaged with the teeth of a reverse train gear 64 rotatable about a shaft 65 the ends of which are fixed in partitions 25 and 26 of the housing H. Reverse gear 64 is in constant mesh with reverse train gear 66 which is fixed to rotate with shaft 32. If slidable reverse gear 63 be slid rearward so that its teeth intermesh with the teeth of gear 64 on shaft 65 then the transmission is in condition to be driven rearward by means of the train consisting of gear 50 on the main clutch shaft, fixed countershaft gear 60, slidable countershaft gear 63, intermediate reverse gear 64, and fixed gear 66 on shaft 32. Manually controllable means are present for coupling the clutch for direct drive forward, for coupling the reverse train, and for holding both clutch element 52 and slidable gear 63 in neutral or non-driving position. The construction and arrangement of this means is, of course, such that neither train can be coupled unless the other is uncoupled.

In order that an operator may effect coupling of the direct drive train or the reverse drive train at will the transmission mechanism is equipped with manually workable shifter mechanism to be now described. As may be seen in Figs. 5 and 7 a slidable shift rod or rail 70 is mounted in slide bearings 71 and 72, so that it may be moved fore and aft parallel with the axis of shaft 32. Secured to the shift rod 70 is a bracket 73 integral with which is a laterally extending double yoke member having two shifter-yoke branches 74 and 75. Branch yoke 74 engages a circumferential groove in slidable dog clutch element 52; branch yoke 75 engages a groove in slidable reverse gear 63 on the countershaft. Hence, if the shift rod 70 be moved in a forward direction from the neutral position illustrated in Figs. 1 and 7, teeth 53 of the slidable dog clutch element may be interlocked with teeth 51 of the companion dog clutch element on shaft 30 whereby shafts 30 and 32 are locked together rotatively, while slidable reverse gear 63 on the countershaft is also moved forward to a new but still idle position. If shaft 70 be moved back to neutral and then still further rearward, slidable reverse gear 63 on the countershaft may be meshed with reverse gear 64 which, as stated, is in constant mesh with reverse gear 66 secured on shaft 32, whereby to couple the reverse train. Dog clutch element 52 then takes a new idle position rearward of neutral. For enabling shift rod 70 to be moved as described, a rock shaft 76 is journaled in a bearing bushing 77 seated in the left hand side wall (looking forward toward the prime mover) of the compartment 22 as indicated in Figs. 2 and 5. An arm 78 is secured to the inside end of rock shaft 76, the lower end 79 of which is suitably rounded to provide a good bearing in a notch formed between lugs 80 projecting from the bracket 73. To the outside end of rock shaft 76 an arm 81 is fixed. Arm 81 is intended to be connected by means of linkage or the like to an operating lever or the like (not shown) located within convenient reach of the operator. In order to releasably latch shift rod 70 so as to hold the elements of the selective gear unit in neutral position, as shown in Figs. 1, 5 and 7, or in either forward or rearward position corresponding, respectively, to coupled forward drive train or rearward drive train, forward bushing 71 is provided internally with three pairs of tapered latching notches 82 (Fig. 7). A hole drilled diametrically thru the forward end of shift rod 70 located within said bushing 72 receives two plungers 83 each having a tapered external end adapted to interengage with any of the three pairs of latching notches 82. The plungers 83 are cupped or hollowed from their inner ends to receive opposite ends of a coiled expansion spring 84, which elastically presses the plungers outward and holds them yieldingly engaged either in the central pair of notches when the shift rod is in the position illustrated corresponding to neutral, or in the forward pair of notches when the shift rod has been moved to the position corresponding to coupled forward speed train or in the rearward pair of notches when the shift rod has been moved to the position corresponding to coupled reverse train.

The frictional variable speed-ratio assembly within compartment 20 of the housing and the means whereby the torque of power input shaft 32 is transmitted thru the frictional power transmitting elements to power-output shaft 35 will now be described.

Within compartment 20 of the housing are three axially spaced races 90, 91 and 92. Said races are concentrically mounted with respect to shaft 35, and the two end races 91 and 92 are so connected to said shaft that they are compelled to rotate therewith although there is capacity for slight relative axial movement between race 92 and the shaft. Intermediate race 90 is so mounted as to be relatively rotatable with respect to shaft 35 about its axis. Intermediate race 90 has a toroidal groove or raceway in each face and each of the races 91 and 92 has a similar toroidal groove or raceway facing the corresponding toroidal groove or raceway in race 90. In order to transmit rotary motion from the center race 90 to the end races 91 and 92, or from the latter two races to race 90, friction power transmitting rollers are interposed between race 90 and said races 91 and 92, with the treads of the rollers in tractive engagement with the toroidal raceways of the races and mounted in such manner as to prevent revolution of the rollers about the axis of shaft 35. There are two sets of transmitting rollers, and each set consists of a plurality of rollers angularly spaced one from another to afford proper balance. In the embodiment illustrated each set consists of three rollers the centers of which are normally spaced at angular intervals of 120°; also the rollers of both sets are similarly disposed so that the same radial planes include the centers of both sets of rollers when in their normal operating positions, that is, when the paths of the rollers on the raceways are circular. One roller of the rearward set, indicated in the drawings by reference character 94M, is herein referred to as the controlling or master roller for reasons that will be made plain hereinafter. The other rollers 94 of the rearward set are follower rollers the ratio positions of which are controlled by the master roller. For convenience the master roller 94M in this embodiment occupies the uppermost position in the roller assembly, i. e. its axis of rotation lies normally in a plane that includes the race axis and is substantially vertical in the transmission as it is mounted in a vehicle, as may be seen in Figs. 1, 2 and 9. The rollers of the forward set are controlled or non-master rollers and are indicated by numeral 95. It will be perceived that if race 90 be rotated, say in a clockwise direction, (viewed from the front of the transmission) the races 91 and 92 and in consequence the shaft 35 will rotate in the opposite or counterclockwise direction, and vice versa. In the embodiment illustrated the engine or prime mover mechanism drives the center race 90 both in forward and reverse gear couplings, so that race 90 may be deemed the driving race of the friction power transmitting assembly. Of course, whenever the vehicle over runs the engine the races 91 and 92 become the driving races and race 90 becomes a driven race transmitting the force of the coasting vehicle to the engine.

In order to transmit torque between power input shaft 32 and power output shaft 35, thru the power transmitting friction races and rollers described, said shaft 32 is positively coupled to the center race 90 by means of a coupling element. The coupling element is rigidly attached to the rearward end of shaft 32 and reaches around the periphery of race 91 to said central race 90 to which it is attached in such manner as to transmit torque thereto from said shaft 32. This coupling may consist of a cup or bell-like device, comprising a cylinder 100, preferably having openings such as 101 and 102, rigidly secured to a flange 103 which has a hub 104 fastened to shaft 32. At its rearward end drum 100 is keyed to the periphery of center race 90 by intercalated rectangular dogs or projections 106 and 107 (Fig. 2) formed respectively on the rear edge of coupling 100 and the rearward portion of the perimeter of race 90. A split elastic ring 105, seated in corresponding grooves in race and drum prevents relative axial movement of race and drum. The hub 104 of flange 103 of the coupling supports the inner race of ball bearing 34 and also gear wheel 66,—shaft 32, coupling 100, 103, 104 and said inner ball bearing race being united so as to rotate together. As illustrated in Fig. 1, the forward end of hub 104 is notched or turreted, while the forward end of the hub of gear 66 is provided with corresponding inward projecting spline-like lugs engaging the notches of the hub and the grooves in shaft 32. The forward end of the hub is threaded for receiving a fastening nut 108 which jams the gear 66 and inner race of the bearing rearward against a shoulder formed at the junction of flange 103 and its hub 104.

Central double-faced race 90 is mounted concentrically with respect to shaft 35 upon a bearing sleeve 110 which is considerably larger than and surrounds the shaft and is fixed to the housing by means of rigid arms 111 the outer ends of which are secured to the housing as by bolts 112.

Forward race 91 is locked to the forward end of shaft 35 to compel race and shaft to rotate together by a radial spline or rib and groove connection between the race and a flange 120 integral or otherwise made rigid with the shaft. The rearward face of flange 120 is provided with radial ribs or grooves, and the adjacent forward surface of race 91 is provided with mating grooves or ribs. In the drawings, Fig. 1, race 91 is shown sleeved snugly on the shaft and provided in its forward side with two diametrically alined grooves 121 engaged by corresponding ribs on flange 120. There is, therefore, a radial spline and groove driving coupling between race 91 and shaft 35 adapted to cause one to rotate with the other without angular lost motion. Race 91 abuts against the rearward face of flange 120 and is kept in that position normally by the pressure of a loading device to be described which exerts force tending to maintain good tractive contact between the rollers and the races.

Race 92 is also connected to shaft 35 adjacent its rearward end so as to compel joint rotation of shaft and race without relative angular lost motion, but to permit some relative axial sliding movement. Said race is sleeved nicely on shaft 35 as illustrated in Fig. 1. Shaft 35 is provided with splines and grooves just rearward of race 92, as indicated by numeral 130, with which a spring abutment collar 131 is slidably interlocked by means of coacting splines and grooves. Collar 131 has a rearward extending hub 132 against the rear end of which bears the front end of nut 38, previously described, threaded on shaft 35. There is a radial spline and groove interlock between race 92 and collar 131, ribs or splines 133 on the forward face of collar 131 engaging corresponding grooves 134 in the rearward face of the race.

Races 91 and 92, it will be seen, are angularly immovable with respect to shaft 35 because of the described means of connecting them together, so that said races must rotate in unison without any relative angular displacement except as may occur by torsional flexure of shaft 35.

The periphery of collar 131 is provided with an annular rabbet or seat 140, as shown in Fig. 1. An annular, washer-like spring 141, tapering in thickness inward from its periphery to its central orifice is sleeved on the abutment collar 131 so that its inner circumferential edge rests in the annular seat 140. The outer zone of the forward face of said washer bears normally against a flat zone 142 on the rearward face of race 92. Spring 141 is normally under tension, which may be varied by rotating the nut 38. The spring 141, therefore, in conjunction with race 92, abutment ring 131, nut 38, shaft 35, flange 120 and race 91, functions as an elastic means for maintaining a precalculated degree of tractive pressure (which may be varied by adjustment of nut 38) between the treads of rollers 94, 94M and 95 and the toroidal raceways of races 90, 91 and 92. It will be remembered that shaft 35 and race 92 are capable of slight relative axial movement to permit variations of pressure or "loading" with respect to rollers and races.

In addition to the elastic force applied thru spring 141 to increase traction of the rollers on the raceways, Fig. 1 shows torque sensitive means to vary the pressure between races and rollers in response to variations of the torque load upon the propeller shaft. Said torque sensitive means comprises rollers interposed between pairs of reversely inclined surfaces on the rear face of race 92 and corresponding pairs of inclined surfaces in the forward face of a hard spacing collar 150, sleeved on hub 132 of abutment collar 131 and disposed between said collar and the forward face of the described universal joint yoke 40, which, it will be remembered, is capable of limited rotation with respect to the shaft 35 and nut 38. Spacing collar 150, on its rearward face, and universal joint yoke 40 on its forward end or face, are mutually provided with interlocking tongues and grooves, indicated by numeral 151, whereby said yoke and spacing collar are compelled to rotate exactly in unison, that is, any rotative movement of collar 150 is imparted to yoke 40 or vice versa. The said inclined surfaces on the rear face of race 92 are indicated by numeral 152 and the cooperating surfaces on the forward face of spacing collar 150 by numeral 153. Between surfaces 152 and 153 one or more torque loading rollers 154 of barrel shape are interposed. These inclined faces may be arranged to present, when viewed in the direction of the axis of roller 154, shallow V-shaped lines, with the openings of the V's opposed. The construction and arrangement of the barrel-shaped roller and the inclined plane or cam surfaces with which it is in contact is similar to those disclosed in patent to Erban 1,683,715. It is not necessary to form roller 154 in the contour of a complete barrel since the inner end of a complete barrel roller— positioned as illustrated in Fig. 1, would have no bearing on the inclined surfaces, therefore roller 154 has been illustrated as a half or slightly larger fragment of a barrel-shaped roller severed on a transverse plane adjacent the longitudinal center. Roller 154 is held in an opening 155 thru spring abutment collar 131, which, therefore, serves as a roller positioning cage. There may be a plurality of rollers and cam surfaces equiangularly spaced. If the load on the propeller shaft (yoke 40) is the normal load for which spring 141 has been adjusted, roller 154 bears in the bottoms of the V notches formed on race 92 and spacing collar 150, and yoke 40 and propeller shaft coupled to it may rotate without angular displacement of spacing collar with respect to race 92. If higher loads are applied to the propeller shaft the spacing collar will yield angularly and in so yielding will force roller 154 in an axial direction and so cause disks 91 and 92 to move axially toward one another and clamp the intermediate rollers with greater force between the center and end races. Torque applied from the engine to race 92 is delivered therefrom to shaft 35 thru abutment collar 131 and thru torque loading rollers 154 to spacer collar 150 and thence to coupling yoke 40 and the propeller shaft. Thus, yoke 40 and spacing collar 150 together constitute a thrust receiving means between shaft 35 and race 92.

The races, the means for mounting them and for transmitting engine torque thru them to the propeller shaft have now been described. The rollers 94M, 94 and 95, which convert the rotation of race 90 into a reverse rotation of races 91 and 92, or vice versa, have been referred to in a general way without describing any means by which said rollers are spaced and supported so as to maintain the roller centers at definite radial distances from the main axis of the transmission, permit the rollers to tilt for the purpose of changing the speed ratio and automatically equalize the torque transmitted by the two sets of rollers and by the several rollers of each set. These means, among others as yet not specifically mentioned, will now be described.

A tube capable of endwise movement surrounds shaft 35. At each end of the tube is a set of radiating roller supporting arms movable endwise with the tube but capable of moving transversely of the shaft axis. The tube may be incapable of transverse movement while the sets of roller supporting arms may be immovable with respect to it axially and angularly although movable transversely of it a limited extent. Or the arms may be rigid with the tube in all respects in case the tube is constructed and arranged to move transversely of the shaft axis as well as longitudinally thereof. In the embodiment illustrated, each of the rearward set of three rollers (94M and 94) is positioned by one of three spider arms 160 radiating from a "floating" tube 161 which surrounds output shaft 35 and passes thru the sleeve 110 on which center race 90 has rotative bearing. Each of the forward set of three rollers 95 is positioned by one of three spider arms 162 radiating from and integral with a hub 163 which is sleeved over and keyed to the forward end of tube 161. Hub 163 is held firmly against a shoulder on tube 161 by a locking nut 163a. As indicated in Fig. 1, arms 160 and 162 have their radial center lines substantially in the same axial planes. The floating tube 161 and radiating arms 160 and 162 form a substantially rigid unit. This floating unit is prevented from rotating with respect to the housing by two elastic arms 164 (Fig. 9) which are integral or otherwise rigidly connected to tube 161 in the same transverse plane as radiating spider arms 160, and arch oppositely somewhat upward (to clear rollers 94) and laterally outward to terminate in preferably spheroidal bearing ends 165 which project into bearing chambers provided at opposite sides of the housing as illustrated in Fig. 9. The spheroidal ends 165 of the two arms 164 are each held between upper and lower bearing blocks 166, each of which has a rounded cavity engaging said spheroidal end. Each bearing block 166 is backed by a supporting block 167 clamped or otherwise firmly attached to the housing. Between blocks 166 and 167 are ball bearing assemblies 168, the balls being suitably spaced in centrally perforated disk-like cages 169. A pin 170 having three spaced flanges extends into each block 166 and 167 and thru the central perforation in each cage 169, the central flange of the pin 170 occupying the center of the perforation thru the cage and the end flanges occupying the perforations respectively in the blocks 166 and 167 thus permitting lateral movement of block 166 and bearing balls. The pins may rock about the center flange to allow slight relative displacement of the blocks and cage and yet prevent entire separation. The described bearings for the ends of arms 164 permit free movement to a small extent of the arms and the tube 161 substantially in a plane including the main axis and the centers of the spherical ends 165 of said arms and in planes parallel thereto, but check any rotating movement of the tube and arms around the main axis. Adjustable stop pins 171 may be adjusted to limit the extent of horizontal transverse movement of the arms 164. The inside diameter of tube 161 is substantially greater than the diameter of shaft 35 thruout the length of the tube and its exterior diameter is smaller than the internal diameter of bearing sleeve 110 (see Fig. 1) thereby permitting bodily movement of the tube and attached spider arms sideways in the planes described. As arms 164 are purposely made elastic, tube 161 and attached spider arms may also move in a plane perpendicular to said plane that includes the main axis and the centers of spheroidal terminals 165. Therefore, tube 161 and attached spider arms have the capacity of floating or moving slideways as a unit in any direction a limited extent. Reference to Fig. 1 shows that said floating unit has also a capacity for limited endwise movement, being centered longitudinally by springs and damping devices. Figs. 1 and 9 show also springs and damping devices for centering said unit transversely.

The means referred to for centering floating tube 161 and its spider arms in a fore and aft direction comprises expansion coil springs 180 and damping devices consisting of cylinders 181 and pistons 182 between which springs 180 react. (See Fig. 1.) Cylinders 181 bear against races 91 and 92 while pistons 182 bear against sealing rings 183 between said pistons and the ends of tube 161. The rear end of tube 161 is yieldably held properly spaced from shaft 35 vertically (considering the normal position of the transmission) by the elastic arms 164 hitherto described. The tube is also elastically spaced laterally from shaft 35 by means of five coiled springs and damping devices two of which are opposed at the rear end of the tube as illustrated in Fig. 9 and three spaced evenly around the front end of the tube, one of which is shown in section in Fig. 1. At its rearward end tube 161 is drilled in the plane of spider arms 160 to form two cylindrical bores 184 (one of which is shown in section in Fig. 9) in communication with the space between the tube and shaft 35. The outer end of each bore is closed by a plug 185. Within each cylinder bore a piston is urged by a coiled expansion spring against shaft 35. The construction of the several laterally acting spring and damping devices, at each end of tube 161 will be more specifically described presently by reference to one of the centering devices adjacent the front end illustrated in Fig. 1. By means of elastic arms 164 and opposed spring and damping devices within the cylinders indicated by 184, the rear end of tube 161 is yieldably centered laterally, that is, with respect to the axis of shaft 35, and may move in any direction in a transverse plane to a limited extent against the opposition of the elastic arms, coil springs and damping devices described.

The forward end of tube 161 is centered with respect to the axis of shaft 35 by three damped elastic devices equi-angularly disposed. One of said centering devices at the forward end is illustrated in section in Fig. 1. It comprises a boss 190, which may be integral with the structure composing the spider arms 162 and hub 163, disposed midway between two of said arms 162. Boss 190 is drilled radially to form a cylindrical chamber or cylinder bore 191 within which is a hollow piston 192 provided with a reduced extension 193 which enters a hole in tube 161 and bears against shaft 35. Extension 193 is perforated so that the interior of the hollow piston is in communication with the annular space between tube 161 and shaft 35. Outer end of cylinder bore 191 is closed by a threaded plug 194 having a guiding extension 195 over which the hollow piston slides. Coiled expansion spring 196 surrounds the piston between plug 194 and an exterior flange on the piston, thus elastically urging the piston against shaft 35. The other damped elastic centering devices, at the front end of tube 161 are of similar construction.

Front end of said floating unit is, therefore, centered with respect to shaft 35, by three symmetrically disposed damped spring devices, the rear end by two damped spring devices and the elastic arms 164, while said unit is held in normal position longitudinally by damped spring devices at opposite ends. Thus the tube 161 and its attached spider arms as a unit may be considered as "floating" in such manner that the unit may move somewhat if subjected to unbalanced forces.

The intermediate friction rollers are shown in the drawings with their center planes parallel with the main axis and their axes of rotation lying in axial planes and, therefore, tracking on equal circles on the raceways so that races 91 and 92 rotate at the same speed as race 90 but oppositely. The rollers are mounted, however, so that they may be tilted into a position wherein their center planes are oblique to the main axis and therefore cause the races 91 and 92 to rotate at a different speed from that of race 90. The mountings of the rollers which render them susceptible to external control and permit them to tilt in order to change the speed ratio of the transmission will now be described.

Roller 94M, herein designated the control or master roller may be mounted on the end of any one of the arms 160. It is illustrated (Figs. 1 and 9) as positioned on that one of the three arms 160 that extends toward the upper side of the housing and as constituting one of the rearward set of rollers as hereinbefore stated. Rollers 94 constituting the other two of the rearward set are mounted respectively on the two other arms 160. The three rollers 95 composing the forward set are mounted respectively on three arms 162, only one of which appears in Fig. 1, but which are equally spaced, as previously stated, the same as the arms 160 shown in Fig. 9 so that the centers of the rollers of one set are intersected by the same axial planes as the corresponding rollers of the other set. The mountings of rollers 95 on arms 162 are identical in structure, each with the others. The mountings of the two rollers 94 on arms 160 are identical, one with the other. The mountings of rollers 94 differ from the mountings of rollers 95 only in that the sense of slant of the spacing blocks 205 (to be presently described) of the rollers of one set is necessarily opposite the sense of slant of the spacing blocks of the other set (Figs. 2 and 11), since the two sets engage opposite faces of the center race to deliver torque to or from races 91 and 92 in the same sense of rotation which is, of course, opposite to that of race 90. A description of the roller mounting including journal bearing and associated parts of one of the rollers 94 or 95 will therefore suffice for all of the controlled or non-master rollers.

The end of each spider arm 160, 162, is expanded into a bearing seat rounded in an axial plane including the main axis, and flattened on opposite sides parallel to said plane, as indicated at 200, (Figs. 1, 2, 10 and 11). Each rounded seat is perforated to receive a hollow pin 201, normal to said axial plane said pin being fixed by a set screw 207. The reaction forces of the rollers are transmitted to bearing seats 200. Each controlled follower or roller is so fitted on journal piece 202 as to be rotatable upon the external cylindrical bearing surface of the latter. Piece 202 is slotted longitudinally of its axis as at 203 (Fig. 2), the sides of the slot being parallel planes but having transverse grooves or key ways 204. Blocks 205, having opposite plane surfaces oblique to one another, each provided with a transverse rib or key 206 (Fig. 2) engageable in the grooves or key ways 204 of the journal piece, are interposed between the bearing surfaces of bearing seat 200, and the opposed parallel walls of the slot 203, the keys 206 of said blocks engaging the grooves 204 of the journal piece. The ends of said pins 201 which pass thru perforations in the seats 200 of the spider arms enter holes in said blocks 205. By means of this construction each roller (94 or 95) is free to rotate on journal piece 202 in order to transmit torque; each of said rollers may tilt around the axis of pin 201 in order to change the paths of contact of its perimeter with the driving and driven races to change the speed ratio of the transmission; and tube 161, each arm (160, 162), bearing seat 200 and spacing block 205 may move in a direction parallel with the main axis and relatively to the controlled rollers 94, 95, and journal piece 202, which are held between the raceways, thus tending to move each roller in a direction resulting in displacing its axis of rotation out of the axial planes that includes the main axis and the roller center in which said axis of rotation lies normally, that is, when the forces acting upon the roller are balanced and the roller tracks in circles on the raceways. The effect of displacing the axis of rotation of a roller out of said axial plane is to bring unbalanced forces to bear upon the perimeter of the roller which cause said roller to track in a spiral on the raceways and thus change the speed ratio position, as disclosed for example in patent to Spencer #751,958. The rollers are considered to be rotating in their normal planes of rotation when their axes of rotation lie in axial planes including the main axis and the roller centers and, necessarily, the center planes of the rollers are perpendicular to said axial planes, whether or not parallel to the main axis. Said center planes are parallel of course to the main axis only when the transmission is in 1:1 ratio.

Control or master roller 94M is mounted on the bearing seat 200 of that arm 160 which supports it by means somewhat different from the means whereon the controlled or follower rollers are mounted, as illustrated in Figs. 1, 2, 9 and 10. Like the bearing seats for the controlled rollers, the bearing seat 200 for the master roller is provided with a central perforation in which a hollow pin 201 is similarly secured. A journal piece 202M, on which roller 94M is mounted so as to rotate freely about its axis, is slotted similarly to journal pieces 202, but the walls of the slot are formed with transverse parti-cylindrical grooves 210, (Fig. 10) in which parti-cylindrical blocks 211 fit. Said blocks 211 are segments cut from a cylinder on planes oblique to the axis. The ends of pin 201 enter holes 212 in the parti-cylindrical blocks 211 thus limiting the movements of said blocks to a tilting movement around the pin in an axial plane including the main axis of the transmission. Some clearance exists between the walls of the slot in journal piece 202M and the faces of bearing seat 200 on arm 160. When the journal piece 202M is assembled with the blocks 211, the outer surfaces of the blocks lie in the same cylindrical surface and constitute a bearing on which the master roller and journal piece may be inclined in a plane transverse of the main axis about a line connecting the points of contact of the roller with the raceways so as to displace the axis of rotation of the roller out of the plane that includes the main axis and roller center for the purpose of causing said master roller to assume a different speed-ratio position. Because the flat faces of blocks 211, the outer cylindrical surfaces of which constitute a bearing on which the roller 94M turns while being inclined, bear upon the flat surfaces of seat 200 of arm 160, and are oblique to the axis of the complete cylinder of which the blocks are segments, longitudinal movement of floating tube 161 may displace the axis of rotation of control roller 94M in a manner similar to that in which the axes of rotation of the controlled rollers are displaced by axial movement of said tube.

Whenever the control or master roller 94M changes its speed-ratio position the controlled rollers 94 and 95 automatically assume a corresponding speed ratio position, each assuming its proportionate share of the load. Consequently by changing the position of roller 94M in response to forces applied by the operator or a governor mechanism or both, the controlled rollers assume corresponding positions.

Means whereby the control or master roller may be adjusted to different speed-ratio positions will now be described:

On the radially outer end or top of journal piece 202M there is a parallel-sided flat-topped ridge or land 215 the outer face of which is substantially parallel with the center plane of roller 94M and the sides or edges parallel with the axis $t-t$. A hole 216 extends thru journal piece 202M and said land 215, to receive a bolt 217, to the opposite ends of which a control yoke 218 is pivoted by means of pivot holes 218A as shown in Figs. 1, 2, and 9. A hole 219 alined with the axis of journal piece 202M receives a stop pin 220 projecting upward into a wider notch between two projections 221 on the inner or free end of the upper arm of control yoke 218. Another hole 222 is adapted to receive a screw 223 for securing to the land 215 a bridge piece 224 integral with two spring arms 225 which extend alongside the land 215, their ends turning toward each other beyond the end of the land. The end of land 215 toward the outer end of yoke 218 (the right as shown in Fig. 9) overhangs journal piece 202M as shown and is curved as indicated at 226 (Fig. 3) on a center $a$ eccentric to the center $b$ around which the control yoke 218 rocks in its limited angular movement. The maximum eccentricity is along the centerline of land 215. A friction pad 227 on the inside of lower limb of yoke 218, which may be integral therewith as shown in Figs. 9 and 10, rests against the lower face of the roller 94M. Another friction pad 228 which may be of metal, made separate from the yoke, is disposed between the inside of the upper arm of yoke 218 and the upper face of the roller 94M as shown in Fig. 9. Friction pad 228 is notched at the end more distant from the roller center at 229 to receive a pin 230 projecting downward from said upper arm of the control yoke, the width of the notch being greater than the diameter of the pin. The inner end of pad 228 has a reentrant curve 231 bearing against the curved end 226 of land 215, and is provided with two limiting pins 232 rising from its upper surface adjacent the ends of the reentrant curve. Pins 232 do not rise high enough to touch spring arms 225 during any angular movement of control yoke 218. As shown in Figs. 9 and 10 upper arm of yoke 218 is jogged upward at 233 on an incline which is curved on the said center $b$ (Fig. 3) with its concavity opposed to the curved end 226 of land 215 and spaced therefrom sufficiently to accommodate a ball 234 as of hardened steel which rests upon friction pad 228 between the ends of spring arms 225 and limiting pins 232. Upper arm of control yoke 218 bears down elastically upon ball 234. The elastic pressure of this arm upon the ball may be regulated by means of the nuts 235 on the upper end of bolt 217. Outer end of control yoke 218 at the junction of its arms is provided with a plate 236 elongated transversely of the arm and said plate has fixed centrally to it a hard spherical bearing 237 for receiving the pressure exerted by an actuating lever operated by some external controlling or governing means. Said plate has opposite parallel surfaces and the mid-plane between said surfaces lies in the mid-plane of roller 94M and of course includes a line formed by the intersection of the mid-plane of the roller with a plane normal to the main axis of the transmission mechanism and including the roller center; said line is represented by the line $t-t$ in Fig. 9. The spherical bearing 237 may be a steel ball pressed into a hole through the plate 236 leaving opposite segments of the ball protruding as bosses on opposite sides of the plate.

When race 90 is being rotated clockwise (as viewed from the left of Figs. 1 and 2) to drive the car forward, roller 94M,—as viewed in Fig. 2— is being rotated counter clockwise. The friction between pads 227, 228 and the roller tends to move control yoke 218 in the direction of rotation of said roller until further movement of said yoke in that direction is stopped by stop pin 220 with control arm slanted toward the driving race as shown in Fig. 2. When race 90 is being rotated counter clockwise, as for backing a car, the roller 94M of course rotates clockwise (viewed from the same view point) and tends to swing control yoke 218 in the opposite direction until again stopped by stop pin 220. So said yoke is slanted to one side or the other of the axis represented by line $t-t$ depending upon the direction of rotation of the roller.

When control arm 218 occupies a position at one limit or the other of its angular range of movement due to the rotation of roller 94M about its axis of power transmitting rotation, the pressure exerted by pad 228 against roller 94M is intended to be rather light inorder to avoid excessive wear and substantial obstruction to the rotation of the roller. Under this condition ball 234 rests (viewed as shown in Fig. 2 in the condition of forward driving) to the left of the axis $t-t$ and to the left of the point of greatest eccentricity of the curved end 226 of land 215 with respect to the point $b$ about which yoke 218 is adapted to rock. The pressure of the elastic upper arm of control yoke 218 is then relatively light upon the ball, which transmits this light pressure to pad 228. Right hand end wall of notch 229 of the pad bears against the stop pin 230, right hand pin 232 bears against the side of the ball 234, and left hand spring 225 is slightly tensioned by the pressure of the ball. Should now the reverse train be coupled roller 94M will start to revolve clockwise. Then the frictional contact of the pads tends to swing control yoke 218 over to the right of the axis $t-t$ (as viewed in Fig. 2). Left hand spring 225 tends to push ball 234 to the right into firmer contact with the two eccentrically disposed arcuate surfaces between which it is seated, the pad 228 also tends to move with the roller to the right until the left hand end of notch 229 contacts with pin 230 and the ball is by these tendencies caused to press with greater force downward upon the pad 228. Due to the increased frictional contact of pad and roller thus effected, the roller carries the control yoke past the axis $t-t$ until said yoke reaches the limit of its range of movement toward race 92 and is stopped by pin 220 with the right hand spring 225 tensioned by the ball and the left hand pin 232 bearing against the other side of the ball. The frictional pressure of pad 228 against the roller 94M is again lightened in this position as it was in the corresponding position at the other side of the axis $t-t$.

Assuming that the forward train is coupled and engine running, control yoke 218 will be in position as shown in Fig. 2, with bearing sphere 237 on plate 236 of control yoke 218 displaced with respect to the axis $t-t$ of roller 94M, into that quadrant of the circle of rotation of the roller tread in which the tread is approaching race 90. Now in order to reduce the speed ratio, that is, lower the rate of speed of the driven races 91 and 92 with respect to the rate of speed of the driving race 90, the roller 94M must be inclined to displace its axis of rotation out of the axial plane in which it normally lies, in a direction to cause the tread of said roller to track on a contracting spiral on race 90 and on an expanding spiral on race 92, so that the roller tilts. Roller 94M may be inclined by pressing downward on the spherical bearing 237 as the mechanism is viewed in Fig. 2. This pressure will incline the roller about an axis passing thru the roller center and the points of contact of its tread with races 90 and 92, and will displace the axis of rotation until it passes to one side of the main axis, or, in other words moves out of the axial plane including the roller center in a direction toward the left side of the housing as viewed in Fig. 9. In order that the roller may continue to transmit rotation at an even rate it is clear that the axis of rotation must lie in the axial plane that includes the roller center and, as a corollary, that the center plane of the roller must be perpendicular to that axial plane whatever the angle of the roller may be with respect to the main axis. In the 1:1 ratio position illustrated, of course, the center plane of the roller is parallel with the main axis and normal to said axial plane. If the ratio position is other than 1:1, the center plane will still be normal to said axial plane but at an oblique angle to the main axis, and of course in either 1:1 or any other ratio the axis of rotation of the roller will lie in said axial plane. Under these conditions the active and reactive forces applied to the roller by the driving and driven races are so balanced that they tend to maintain the central plane of the roller normal to and its axis of rotation in, said axial plane. When roller 94M has been inclined as described so as to displace its axis of rotation out of said axial plane and its central plane of rotation out of perpendicular with respect to said axial plane, it immediately begins to tilt, that is, to move angularly so that its plane of rotation changes with respect to the main axis. It is, therefore, necessary, when the desired degree of tilt has been reached that the axis of rotation of the roller and its plane of rotation be restored respectively into said axial plane and said plane normal thereto. Restoration is accomplished automatically by ceasing to press further against the bearing 237 and holding that bearing stationary until the plane of rotation, now held so that it tilts around an axis determined by the center of spherical bearing 237 and the roller center, again coincides with a plane normal to said axial plane and the axis of rotation of the roller again lies in said axial plane. When reverse train is coupled it is obviously necessary in order to vary the speed ratio to apply force to bearing 237 on the other side of axis t—t in the approaching quadrant between said axis and point of tractive contact of the roller with race 92, since the sense of rotation of races 90 and 92 is now opposite that which prevailed during forward driving.

In order that force may be imparted to control yoke 218 for the purpose of effecting inclination of the master roller 94M to initiate a tilting movement thereof to a new speed-ratio position a controlling element in the form of a bell crank lever is provided as illustrated in Figs. 2, 4, and 9. Said bell crank lever comprises a rock shaft 240 having bearing in a bushing 241 within a detachable bearing bracket 242 secured within the housing, a bifurcated power arm 243 keyed to the outer end of said rock shaft and a double acting work arm 244 consisting of a slotted member extending transversely of and integral with or otherwise rigidly united centrally of its length to the inner end of the rock shaft. Rock shaft 240 and work arm 244 of the bell crank lever have the contour of the letter T as may be seen in Fig. 2, the slot 245 in the work arm trending fore and aft when the 1:1 ratio prevails. Plate 236 lies within slot 245 which is just wide enough to receive the spherical bearing contact member 237, but so that there may be sliding motion between said member and the sides of the slot. Adjustable stop pins 246 are disposed in the double acting work arm 244, two opposed one to the other on opposite sides of the axis of the rock shaft as indicated in Fig. 2 and 9. One end or the other of plate 236 on control yoke lies between the inner ends of said pins as shown in Fig. 13. The axis of said rock shaft extends parallel with the line t—t (Figs. 2 and 9), and is preferably offset slightly therefrom for a purpose to be hereafter stated. In Fig. 13 the adjacent arrow-points at i indicate this offset relation which in the illustrated embodiment, is in a horizontal plane which is a plane coincident with the central plane of roller 94M when the latter is in 1:1 ratio position.

When the drive is in a forward direction, control arm 218 slanted toward driving race 90, and spherical bearing member 237 disposed in the "approaching" quadrant of roller 94M, if rock shaft 240 be rotated in a clockwise sense, viewed from the outer end of the rock shaft (the right of Fig. 9 and the top of Fig. 2), the platen 236 will be depressed (from the point of view of Fig. 2) by reason of pressure applied to bearing member 237 and control yoke, journal piece and roller inclined out of the normal plane of rotation in a direction that will cause the roller to spiral inward on race 90 and outward on race 92 thereby rotating the latter race at a slower rate of speed than before,—in other words lowering the ratio of output to input speed. Pressure of work arm 244 on the bearing member 237 will move plate 236 to a new position substantially parallel to its former position until said plate contacts with one of the stop pins 246, as indicated by the diagrams Figs. 13, 13a and 13b. The amount of rotation of the rock shaft is thus limited by the movement of the plate 236 within the slot 245, since the control arm and plate are rigid torsionally and the heavy pressure of the races upon the tread of the roller tends strongly to prevent the latter from sliding radially on the races to a new ratio position by any force applied to the rock shaft tending to rotate said plate about the tilt axis of the roller. The amount of inclination, therefore, that can be imparted to the roller preliminary to the assumption by the roller of a new ratio position is limited by the amount of clearance between the plate 236 and the sides of the slot as represented by the adjustable stop pins. So it is not possible to change ratio position too rapidly. In changing to a higher ratio of output to input speed rock shaft 240 would be rotated in the opposite sense (counter-clockwise viewed from the outer end of the rock shaft).

When the drive is in reverse control yoke 218 assumes a position in the quadrant of rotation approaching race 92 or, looking at Fig. 2, a slanting position to the right of the axis t—t. Arm 244 on the opposite side of the axis of rock shaft 240, from that which operated on the control yoke 218 during forward drive, now engages spherical bearing member 237. The same movements of the rock shaft 240 that determined the assumption of low and high speed ratio positions by roller 94M in forward drive now determine the assumption of low and high speed ratios in reverse drive.

If the axis of rock shaft 240 coincided with the axis t—t of roller 94M when rotating in its normal plane, proper movement of said rock shaft would impart equal angles of inclination of the roller from the normal plane of rotation in all tilt positions of the roller so that the rate of speed ratio change would be the same when shifting from any speed ratio or tilt position. It is desirable, however, that the rate of speed-ratio change vary in accordance with tilt or ratio position and the direction or sense of change from that position. In order to obtain this variable rate of speed-ratio change the axis c—c of rock shaft 240 has been offset from the axis t—t when the roller is in its normal plane of rotation as shown in Figure 13. Owing to the different positions of the centers around which the roller 94M tilts and the rock shaft 240 rocks, the work arm 244 of the rock shaft assumes different angular positions with respect to the plane of rotation of the roller in its different tilt positions and therefore of the plate 236 which includes said plane of rotation. By reference to Fig. 13 it will be seen that in the 1:1 ratio position of the roller, work arm 244 lies parallel with plate 236, if the axis of rotation of rock shaft 240 lies in the normal plane of rotation of the roller when in 1:1 ratio position as shown. If, now, the rock shaft be rotated clockwise around its center of rotation c a limited inclining movement will be imparted to the plate 236, control arm and roller, the extent of which is determined by the distance between the lines i—i Fig. 13. As the roller tilts toward low-speed ratio position, the work arm assumes an increasingly greater angle with respect to the plane of plate 236 thus allowing an increasingly greater extent of inclining movement of said plate, and therefore of the roller, so that as the roller tilts to lower speed ratio positions (Fig. 13a) the rate of tilting increases. In proceeding from low-speed ratio positions toward 1:1 ratio, the successive inclining impulses cause progressively lesser amplitudes of inclining movements of the plate, control arm and roller until 1:1 ratio position is attained. In going into over drive, that is, proceeding from 1:1 ratio position shown in the diagram, Fig. 13, toward the higher-speed ratios, the rock arm assumes angles with respect to the plane of the plate, as indicated in the diagram, Fig. 13b, the same in measurement for the same degrees of tilt but with openings on the opposite side of the plate as compared with Fig. 13a. Thus in shifting from 1:1 ratio to higher speed ratios the rate of ratio change permissible increases in the same manner as in proceeding from 1:1 to lower speed ratios. Any disposition of the axis or center of rotation c of the rock shaft that is a different distance from the center of spherical bearing 237 than is the center or axis of tilt represented by t will cause variations in the rate of tilt from a higher to a lower speed ratio position or vice versa. And the relations of these two centers may be readily chosen so as to effect the desired results. As external force for operating the rock shaft 240 and work arm 244 is applied by means of an elastic link or equivalent compensating device between it and the governor, as hereinafter described, the latter may set the limit of ratio change required for a given engine speed, while the work arm 244 by reason of the described construction and relationship to the plate 236 will limit the rate of inclination of the roller.

Forked power arm 243 keyed to the outer end of rock shaft 240 receives the rear end of an elastic link between its limbs to which the link is pivoted by a pin 247 held in place by a plate 248 secured to shaft 240 by nut 249. The other end of said elastic link is connected by appropriate link and lever mechanism to a centrifugal governor, a manual control means and a damping device, all to be presently described. The connections and devices referred to will be considered, proceeding toward the governor and manual control from the power arm 243 of the bell crank lever that directly imparts inclination to the master roller 94M and initiates conditions for producing ratio change.

Said elastic link (Fig. 4) comprises a fitting 250 pivoted to arm 243 by pin 247; a rod section 251 screw connected to the fitting, said rod section having an enlargement 252; a tubular sleeve 253 within which rod section 251 may slide telescopically, being guided therein by a smoothly perforated plug 259 secured in one end of the sleeve, and the enlargement 252 sliding in a bearing surface within the sleeve; a second rod section 254 adjustably threaded into a plug 255 secured in the other end of the sleeve 253; pre-loaded or compressed coiled expansion springs 256 interposed between washers resting against the ends of the enlargement 252 of rod section 251 and the plugs at the ends of the sleeve, and a fitting 257 connected to rod section 254 pivoted at 258 to the longer arm 260 of a bell crank lever, fulcrumed at 261 to arms 262 on a balanced rockable member 263, which is provided at each end with shaft extensions 264, 264a (Fig. 2) turning in bearings in the housing. The fulcrum 261 of said bell crank lever consists of a pintle rod 269, secured to and extending between said arms 262. The bell crank bell comprises a sleeve 265 surrounding pintle rod 269 as shown in Fig. 2, to which sleeve, near one end, arm 260 is integrally or otherwise rigidly united. Two shorter arms 266 and 267 have forked ends engaging pins 268 projecting from diametrically opposite points on a ring 306 sleeved in a groove in a governor controlled sleeve 270.

In the illustrated embodiment sleeve 270 (Fig. 5) surrounds an upright shaft 271 perforated throughout its length, as at 272. The lower end of shaft 271 is supported in a step bearing 273 in the housing, while a stud 274 depending from the housing enters a counter bore 275 in the upper end of the shaft. Beneath the counter bore 275 is a smaller counter bore 276 receiving a coil spring 277 which presses against a ball 278 disposed in counter bore 275, tending to press said ball upward against the lower end of stud 274 (which has a conical seat therein) and said shaft downward. The upper end of shaft 271 is somewhat enlarged and has rigid with it diametrically opposite pairs of spaced ears 279, between which are pivoted lever arms 280 having ball weights 281 at their outer ends. Said lever arms are fulcrumed at 282, and have their inner or work arms 283 formed with curved cam-like lower surfaces bearing upon the smooth top of sleeve 270. Stops 283a limit the upward swing of arms 283. Shaft 271 carries an adjustable spring abutment collar 284. Surrounding shaft 271 above the abutment collar is a coiled spring 285; surrounding the shaft 271 above the spring 285, is a slidable collar 286 pressed upward by the spring against a shoulder 287 on the shaft. Above the collar 286 is another coiled spring 288, surrounding said shaft and pressing against collar 286 and an internal flange formed at the upper end of sleeve 270. This sleeve is drilled and counter-bored to afford a nicely fitted bearing for the sleeve to slide on the shaft and on the collar 286, and providing space between the shaft and sleeve for said springs. An internal shoulder 289 within the sleeve is adapted to engage collar 286 after a given extent of downward sliding movement of the sleeve. The resistance of spring 288 to compression is less than that of spring 285 so that after contact of shoulder 289 with collar 286 resistance to downward movement of the sleeve is increased. Adjacent its lower end a helical tooth pinion 290 is fixed to shaft 271 with its lower face resting against the flange of a flanged bushing which lines the step bearing 273. Helical gear 291 rotatable on fixed shaft 65 meshes with said spiral pinion 290. Gear 291 is integral or otherwise fixedly joined to spur gear 64, which, it will be remembered, is the reverse idler gear always in mesh with gear 66 fixed to shaft 32. From the described construction and arrangement of the governor and the link and lever connections therefrom to the described control yoke 218, the position of which determines the speed ratio position of said master roller 94M, it will be perceived that increasing speed of input shaft 32 causes the centrifugal forces exerted by the governor balls to move governor sleeve 270 downward thereby rocking link connected arms 260 and 243 counter clockwise (viewed from the right hand side of the transmission housing—i. e. from the top of Fig. 2, front of Fig. 4, and right hand side of Fig. 9). Counter clockwise rotation of rock shaft 240 to which arm 243 is keyed, it will be remembered, imparts an inclination to roller 94M in such a manner as to initiate a tilting movement thereof to a higher-speed ratio position, that is, roller 94M tracks in an expanding spiral on driving race 90 and a contracting spiral on driven race 92. Hence, increasing speed of input shaft tends, thru the governor, to adjust the master roller to a high-speed ratio position, and, reversely, decreasing speed of the input shaft tends to effect adjustment of the master roller to a lower speed ratio position.

Shaft extension 264a of rocking member 263 protrudes thru the housing H and to the protruding end of said shaft extension an arm 292 is fixed. Arm 292 is connected to external control means (not shown) under manual control of the operator.

On member 263, which may be rocked by external force applied to arm 292, are two short lugs or arms 293 of substantially the length of arms 262, before described, projecting from the opposite side, however, of said member. Between said lugs one end of a link 294 is pivoted, the opposite end of said link being connected to the piston 295 of a dash pot disposed within the lower portion of compartment 22 of the housing where it is submerged in lubricating oil when the housing is properly supplied therewith. Said piston is ported as at 296 and the ports are normally closed by a check valve 297 elastically seated by a coiled spring 298 surrounding a central depending projection 299 provided with an abutment flange 300 between which and the valve the spring is confined. A by-pass 301 (Fig. 8) may be regulated in the usual manner by a needle or equivalent valve 302. Upward movement of the piston accompanying rocking of member 263 counter-clockwise as viewed in Fig. 4, is relatively unresisted because the valve then opens; but downward movement of the piston accompanying clockwise rotation of member 263 is resisted because in this direction of movement the valve is under pressure of the fluid in the dash pot.

It will be perceived from inspection of Fig. 2 that manually operative arm 292 secured to the shaft 264a of rockable member 263 projects thru the right hand side of the transmission housing as viewed from the rear of the transmission. Hence, if arm 292 be moved manually in a counter-clockwise sense of rotation (see Fig. 4) the bell crank lever will fulcrum on pins 268, (movement of which is resisted by governor action) and upper end of arm 260 of said lever will move clockwise or forward (to the right, Fig. 4) thereby imparting a clockwise movement, (thru the described elastic link connection) to arm 243, rock shaft 240, and lever work arm 244, which, in the forward driving condition, it will be apparent, inclines master roller in the sense which guides it to a lower speed ratio position. This movement toward low-speed ratio position is resisted only slightly by the dash pot resistance and may be rapid. Contrarily, if manual control arm 292 be rocked in a clockwise sense arm 260 will move counter-clockwise and cause rock shaft 240 to incline the master roller in a sense which guides it to a higher speed ratio position and the latter movement tends to be slow because in this direction the dash pot resistance is high. The effect of rocking the manual control arm 292 when the transmission is in reverse will be the same as that described for forward drive since inclination control yoke 218 shifts position automatically as described, when the races reverse.

Lubrication is accomplished by maintaining oil in the housing to enable the moving parts to be lubricated by splash, and also by forcing oil under pressure to those parts likely to be inadequately lubricated by splash. As shown in Fig. 1 there is an oil sump in the housing extending along beneath the gearing and other mechanism in compartment 22 and beneath the friction races and rollers in compartment 20 as far rearward as the transverse joint between the front and rear sections of the housing H. A meshed screen 310 separates the sump from the main part of compartment 20 to remove the coarser solid impurities that may be in the oil as it flows into the sump from compartment 20. The bottom of the sump is formed by a sheet metal plate 311 corrugated in a fore and aft direction as indicated in Figs. 1 and 5. Plate 311 is bolted, oil tight, to the housing H against an interposed gasket 313 by bolts 312 and is provided with a drainage port closed by a screw plug 314.

In the lower portion of chamber 22 (Figs. 1 and 5) an oil pump is disposed in position to be submerged in oil when the housing has been charged with the normal quantity of lubricating oil. The oil pump shown is of the gear pump type comprising a pump casing 315 enclosing meshed oil impeller gears 316 and 317. Suitable intake and discharge ports (not shown) for oil, are provided in the casing according to conventional practice, the intake being suitably screened if required. A pressure chamber 318 communicates with the discharge or pressure port. Said pressure chamber is provided with a suitable relief port 319 which is kept closed by a spring urged valve 320 until abnormal pressure compels it against the elastic pressure of the spring to open the port and allow oil to escape into the sump. Impeller member 316 of the pump is secured to a vertical shaft 321 to the upper end of which is keyed a helical driven gear 322 in constant mesh with a helical driving gear 323 fixed to countershaft 61. When main clutch shaft 30 is coupled to the engine and gear in neutral, the oil pump may be driven from the engine to force oil circulation before starting the car. Pressure chamber 318 is in communication with two pipes or other oil conduits to conduct oil therefrom to the parts requiring to be lubricated by a forced feed of oil.

Oil pipe 330 leads from pressure chamber 318 to right angularly disposed communicating passages 331 and 332 drilled in the housing. A radially disposed tube 333 has its radially outer end seated fluid tight in a seat fitting 334 slidable radially in passage 332, and its radially inner end seated fluid tight in a cavity 335 formed for the purpose in floating tube 161 and having communication with the annular space between said tube and shaft 35 as shown in Fig. 1. The fitting 334 is backed by a spring 336. Thus the ends of radial oil pipe 333 are maintained in fluid tight communication with oil passage 332 and the annular space between floating tube 161 and shaft 35. Thru the conduits and passages thus far described oil under pressure fills said annular space which is sealed at each end by the described spring-enclosing dash pots which receive oil for damping purposes. Each spider arm 160, 162 is drilled radially as at 337 (Figs. 1 and 9). Oil under pressure, therefore, enters the passages in the spider arms and proceeds to the previously described bearing elements for the power transmitting rollers mounted on their outer ends. From these radial passages in the spider arms oil enters thru lateral hole 338 (Fig.

10) into each hollow pin 201 from the ends of which it flows to the surfaces between the bearing planes of the controlled-roller supporting spider arms and inclined blocks 205, and between said blocks and the parallel sides of the slot in said journal pieces 202. Oil distributing grooves may be formed in these surfaces if desired. In the bearing elements of the controlling or master roller the flow of oil is the same, remembering that here parti-cylindrical blocks 211 take the place of the plane-sided blocks 205 of the controlled roller bearings. The forward raceways are lubricated and cooled by oil jets projected against them from oil jet tubes 340 (Fig. 1) communicating with one or more of the spring containing laterally acting dash pot cylinders utilized as lateral centering means for the forward end of tube 161. Similar jetting devices may be applied to jet oil upon the opposite raceway of race 90 and upon the raceway of rearward race 92. Preferably, however, for the purpose of lubricating the rearward raceways, spring arms 164 (Fig. 9) are provided with oil passages 341 communicating with the space between tube 161 and shaft 35, and with jet orifices 342.

For the purpose of lubricating the governor shaft bearings and governor parts, oil is conducted from oil pressure chamber 318 thru oil conducting pipe 350 (Fig. 5) to a passageway 351 drilled diagonally upward in the housing to step bearing 273 for the governor shaft. Oil under pressure therefore, enters the step bearing, passes upward thru the passage 272 drilled thru the governor shaft to ball 278 and stud 274 lubricating these. Some of the oil is forced out of the top of the governor shaft and flows outward over the top, downward between and over lugs 279 to oil the ball governor arms and pivots, and also down governor shaft inside of the governor sleeve to lubricate the relatively sliding surfaces therein.

Parts not receiving oil directly from the pressure system described are lubricated by the oil spray and fog created by the movements of the rotating parts in the oil contained in the housing, suitable oil holes being provided wherever needed to allow oil spattered onto external surfaces to get to bearing surfaces within, as shown for example, in Fig. 2 where oil holes 352 may be seen in sleeve 253 of the elastic link connection and an oil hole 353 in bracket 242 in which rock shaft 240 has bearing.

To put this transmission into operation selective gear set shift lever 81 (Fig. 5) should be so operated as to adjust the selective gear assembly in neutral, (that is when slidable clutch element 52 is disconnected from the prime mover shaft 30 and sliding gear 63 on the countershaft is out of mesh with the reverse idler), and the engine started with the main or engine clutch open if such a clutch is used. The clutch may then be let in. Now no motion is transmitted to the friction transmission unit. The oil pump, however, being geared to the countershaft 61 starts and begins to circulate oil to the parts of the friction unit and governor. The governor, however, is idle since it is geared to the input shaft 32. The friction rollers are in low speed ratio position prior to starting having been so adjusted by the governor. To start the car forward, the main clutch may be released in the usual manner, shift lever 81 manipulated so as to cause engagement of the jaw clutch elements 51 and 53, thereby coupling input shaft 32 to the engine. Upon permitting the main clutch to reengage said shaft 32 transmits its rotation (received from the engine) to the governor, and to race 90; the latter rotates rollers 94, 94M and 95, which in turn rotate races 91 and 92 and thru the latter output shaft 35. Output shaft 35 transmits its rotations to the forked coupling 40 which has a lost motion driving connection therewith and transmits rotation to the load as for example, to the traction wheels of a car. Spring 141 provides the axial pressure between races and rollers necessary to produce adequate tractive engagement for light loads. As the load increases the forked coupling 40 yields angularly thereby transmitting an axial force thru the described torque loading devices to race 92, thus increasing the pressure between races and rollers as the need therefor increases.

As engine speed increases the governor applies a yielding force to shaft 240 tending to rock it in a counterclockwise direction as viewed from the right of Fig. 9. As master roller 94M is now rotating counterclockwise, as viewed in Fig. 2, control yoke 218 is in the advancing quadrant of roller 94M with respect to race 90, so that as the T-head or double ended work arm of lever 244, rigid with the rock shaft 240, rotates counterclockwise the master roller is inclined in a sense to initiate tilting or ratio changing movement toward a higher speed ratio position. As the master roller assumes a higher speed ratio position and thus develops a higher reaction torque, or transmits more of the load than the other rollers of the set, the rear end of sleeve 161 is displaced in a direction parallel to the plane of the torque forces tending to displace the roller axis, by reason of the pressure exerted by the master roller on its spider arm in a direction tending to reduce its speed ratio. The displacement of the axes of rotation or centers of the other two rollers 94, as will be seen upon reference to diagram Fig. 12, is one-half as much as the displacement of master roller 94M due to overload (which is in a direction to reduce speed ratio) and in directions which cause said rollers 94 to assume a higher speed ratio position, so that they will equal the speed ratio position of the master roller when restoration of its displaced axis has occurred. As the speed ratios of the set of rollers 94M, 94 were being equalized, the speed ratios of the other set of rollers 95 were being equalized, with those of rollers 94M, 94, because, (referring to diagram Fig. 11) the combined torque reaction of the set of rollers 94M, 94, having become greater than that of the set of rollers 95, floating tube 161 has been moved axially (toward the right as shown in the diagram Fig. 11) by the lateral pressure of the journal pieces 202 of the rollers 94M, 94, upon the inclined blocks described as located between the ends of the spider arms and the journal pieces; and this axial movement of the floating tube has imparted a lateral component to the rollers 95 and displaced their axes of rotation in a direction to induce them to tilt to a higher ratio position while the rollers 94M, 94, were being simultaneously moved to reduce their speed ratio until equality of load between the rollers of the two sets became established.

Similarly, if by chance any roller of either set assumes or transmits more load than the others, equalization will take place by the means described.

Referring again to Figs. 11 and 12, if roller 94M carries more than its share of the load, its axis of rotation will be displaced in a downward direction as viewed in Fig. 11, if race 90 rotates in the direction indicated by the arrow, or to the left as viewed in Fig. 12 (a diagram of the spider arms 160 as viewed from the right of Fig. 11), where $n$ indicates the center of the master roller 94M and $n^2$ and $n^4$ indicate the centers of rollers 94. The spider arms 160 being free to move transversely of the main axis of the transmission they will assume the positions indicated by dotted lines. The axis or center of roller 94M, represented by $n$, will have moved to $n'$, while the axes of rollers 94 represented by $n^2$ and $n^4$ will have been moved to $n^3$ and $n^5$ respectively. The axes of rollers 94 will have been moved just one-half the distance of the movement of the axis of roller 94M as can be proven. Inspection of the diagram will show that the movement of the axis of roller 94M ($n$) is in a direction that will bring about a reduction of speed ratio, while the direction of movement of the axes of rollers 94 ($n^2$ and $n^4$) is such as to bring about an increase of speed ratio, the total result effecting an equal distribution of load among the rollers 94M and 94.

When any inequality of torque exists between the set of rollers 94M, 94, and the set of rollers 95, equalization between the two sets is effected as has been described. But, referring more specifically to Fig. 11, and assuming race 90 to be rotating in the direction indicated by the arrow,—if rollers 95, for example, transmit more torque than rollers 94M, 94, the reaction of rollers 95 will force the spider arms 162 and tube 161 endwise,—to the left as viewed in said figure, by reason of the axial component produced by the inclined faces of blocks 205. This movement tends to displace the axes of rotation or centers of rollers 95 downward as viewed in Fig. 11 and the center of roller 94M, upward, as viewed in Fig. 11. Thus the displacement of the axes of the two sets of rollers will be equal and opposite, so that the rollers of both sets will tilt to new and similar ratio positions.

When master roller 94M has been inclined as described by a force applied thru rock lever 240, 244, upon control yoke 218, the roller begins to tilt to a new ratio position. Since the rock lever when rocked to the intermediate limit permitted holds the yoke in the inclined position at the point of contact between yoke and rock arm, the roller is forced to turn or tilt for the moment around a line joining the said point of contact with the roller center and this turning or tilting movement continues until the roller axis becomes restored to the radial plane including the main axis and the roller center, when the torque forces acting on the roller are balanced.

The spring devices illustrated as acting constantly upon the floating tube and spider arms tend to keep this unit in a central normal position endwise and laterally. Any force suddenly applied tending to displace the floating unit from its normal position is opposed by the dashpots described so that oscillations of this unit are damped.

The control exercised by the governor over the master roller 94M being exercised thru an elastic link the movements imparted to the master roller to control its ratio position are not too sudden; and when the shift is made manually toward high the dash pot illustrated in Figs. 4 and 8 checks too rapid movement. The control exercised manually thru arm 292 and rocking member 263 may be effected independently of the governor.

A specific embodiment of the invention has been described and illustrated in accordance with the requirements of the statutes, but as it is apparent that the principles involved may be reduced to practice in other specific embodiments within the spirit of the invention, it is not intended that protection shall be limited to the specific construction disclosed.

We claim:

1. In power transmitting mechanism, the combination of prime mover mechanism; axially alined power input and power output shafts; a variable speed-ratio frictional power transmitting unit for rotating the power output shaft; means for driving the frictional power transmitting unit from the power input shaft; a selective gear power transmitting unit for driving the power input shaft; means for selectively coupling the power input shaft to the prime mover mechanism; means for lubricating the elements of the frictional power transmitting unit including a pump; a speed responsive governor, means controlled by the governor operative to vary the speed ratio of the frictional power transmitting unit; a driving element on the prime mover mechanism, driving connections therefrom to the pump, and driving connections from the selective gear power transmitting unit to the governor.

2. In frictional power transmitting mechanism, the combination of coaxial spaced apart races with toroidal raceways, intermediate tiltable rollers in tractive engagement with said raceways whereby torque may be transmitted from one race to the other, a floating roller support capable of movement transversely of the race axis and elastic means tending to hold said floating roller support in a normal centralized position.

3. A combination as defined in claim 2 in which the elastic means consists of a plurality of elastic devices tending to hold said floating roller support in the normal centralized position, said elastic devices being angularly spaced with respect to the directions of application of their elastic forces, and vibration damping means associated with said elastic devices.

4. A combination as defined in claim 2 associated with a shaft coaxial with the races, a plurality of elastic devices tending to hold said floating roller support in the normal centralized position, said elastic devices comprising spring pressed plungers and dash pot cylinders enclosing said spring pressed plungers disposed on said roller support, the ends of said plungers bearing against the shaft.

5. A combination as defined in claim 2, associated with a housing, transversely elastic arms on said floating support, and floating bearings in said housing for receiving the ends of said arms.

6. A combination as defined in claim 2 in which the transversely floating support comprises three equally spaced arms radiating outward from the race axis, tiltable journals on the ends of said arms on which the rollers rotate and with which they may tilt.

7. In frictional power transmitting mechanism, the combination of a shaft, two spaced apart races secured to said shaft so as to rotate therewith, an intermediate race coaxial with said shaft and rotatable independently thereof, a bearing sleeve for said intermediate race spaced from the shaft, an endwise floating tube surrounding the shaft and passing thru said bearing sleeve, individual roller supports on each end of said tube, tiltable rollers on said supports and bearings for the rollers, and coacting means on said supports and bearings whereby endwise movement of the floating tube resolves the endwise movement into forces having components effecting bodily displacement of the roller axes from their normal position in order to induce the rollers to tilt.

8. A combination as defined in claim 7 with the addition of damped elastic devices disposed on the shaft at the ends of the floating tube and operating to normally center said floating tube endwise.

9. A combination as defined in claim 7 with the addition of damped elastic devices for centering said floating tube longitudinally consisting of dashpots having annular cylinders surrounding the shaft at the ends of the tube and an annular piston in each cylinder associated with springs urging said pistons against the ends of the tube.

10. In frictional power transmitting mechanism, a housing; a shaft journaled therein; spaced apart races having toroidal raceways in driving connection with said shaft, a bearing sleeve coaxial with and surrounding said shaft between said races there being an annular space between said shaft and sleeve; means for fixing the bearing sleeve with respect to the housing; a race journaled on said bearing sleeve, having opposed toroidal raceways; an endwise and transversely floating tube surrounding the shaft within the bearing sleeve normally spaced from both shaft and sleeve; damped elastic devices for centering said tube transversely and longitudinally in its normal position; roller supporting arms on each end of said tube; tiltable journals on said arms; friction rollers in tractive engagement with the races rotatable on said journals, and coacting means disposed on the roller supporting arms and journals for translating longitudinal movement of the floating tube into a bodily movement of the rollers to displace their axes of rotation out of the normal plane 11. In frictional power transmitting mechanism, the combination of coaxial spaced apart races having toroidal raceways; a set of tiltable intermediate rollers including a master roller capable of independent adjustment in tractive engagement with said raceways whereby torque may be transmitted from one race to the other; means operative on the master roller by externally applied force for adjusting it independently of the others and means responsive to variations of torque transmitted by the several rollers for adjusting all of the rollers to positions in which they transmit equal torque.

12. A combination as defined in claim 11 associated with a transversely floating support for said rollers.

13. A combination as defined in claim 11 associated with a transversely floating support provided with three roller supporting arms equiangularly spaced upon which the rollers are journaled, and tiltable means for mounting each of said rollers, means for mounting said master roller so that it may be inclined and means for applying external force to incline said master roller.

14. In frictional power transmitting mechanism, a plurality of coaxial races having toric raceways, a normally centered transversely floating roller support having supporting arms, a tiltable trunnion on each arm, one only of said trunnions mounted so as to be inclinable, friction rollers journaled on said trunnions and means for inclining said inclinable trunnion and the roller journaled thereon by externally applied effort.

15. In frictional power transmitting mechanism, three spaced apart coaxial races, a floating support normally centered endwise, said support including a tube passing freely thru the center of the middle one of the three races and provided with spider arms at each end, a tiltable trunnion on each arm, one only of said trunnions mounted so as to be inclinable, a master roller journaled on said inclinable trunnion, other rollers journaled on the other trunnions, inclined surface devices between the arms and all of said trunnions whereby an endwise movement of the floating support imparts a movement to the trunnions tending to displace the roller axes out of the radial planes in which they normally lie.

16. In frictional power transmitting mechanism, a housing, coaxial races having toroidal raceways, a friction roller in tractive engagement with said raceways, supporting means for the roller including a tiltable and inclinable bearing member, a control member attached to the bearing member for inclining it, said control member having external pressure receiving means disposed radially outward of the perimeter of the roller and means including an actuating member mounted on the housing engageable with said pressure receiving means, said actuating member comprising a pivoted lever having parallel surfaces embracing the pressure receiving means on said control member, said pressure receiving means being bisected by the center plane of rotation of the roller.

17. In frictional power transmitting mechanism, a housing, coaxial races having toroidal raceways, a friction roller in tractive engagement with said raceways, supporting means for the roller including a tiltable and inclinable bearing member, a control member attached to the bearing member for inclining it, said control member having external pressure receiving means disposed radially outward of the perimeter of the roller bisected by the center plane of the roller and means including an actuating member mounted on the housing engageable with said pressure receiving means, said actuating member comprising a rock shaft, and a rock arm, said rock arm having parallel surfaces extending transversely of the rock shaft and embracing the pressure receiving means on said control member.

18. In frictional power transmitting mechanism, a housing; coaxial races having toroidal raceways; a friction roller in tractive engagement with said raceways; supporting means for the roller including a tiltable and inclinable bearing member; a control member attached to the bearing member for inclining it, said control member having a pressure receiving plate disposed radially outward of the roller perimeter, said plate having surfaces parallel with and on opposite sides of the center plane of the roller and opposite bearing projections one on each side of the plate; and a pivoted lever fulcrumed on the housing, said lever having a rock arm provided with opposed parallel surfaces spaced apart substantially a distance equal to the distance between the bearing surfaces of the bearing projections, said opposed surfaces of the rock arm embracing the plate and bearing projections.

19. A combination as defined in claim 18 in which the axis of the rock shaft of said actuating means is slightly displaced from and substantially parallel with respect to a line passing thru the center of the roller and perpendicular to a radial plane that includes the race axis and the roller center.

20. A combination as defined in claim 18 in which the axis of the rock shaft of said actuating means lies in a plane parallel to the axis of the races and perpendicular to a radial plane including the race axis and the roller center, said rock shaft axis being, however, offset from and parallel to a plane passing thru the roller center and normal to the axes of the races.

21. In frictional power transmitting mechanism coaxial races having toroidal raceways; a friction roller in tractive engagement with the raceways; supporting means for the roller including a tiltable and inclinable bearing member; a control member pivoted to the bearing member; pressure receiving contact means disposed on said control member; means whereby said control member may be moved a limited extent to adjust its pressure receiving contact means to one side or the other of a plane normal to the race axis and intersecting the roller center, and actuating means arranged to contact with the control member in any of its adjusted positions for moving the control member in a direction to incline the roller.

22. In frictional power transmitting mechanism, coaxial races having toroidal raceways; a friction roller in tractive engagement with the raceways; supporting means for the roller including a tiltable and inclinable bearing member; a control member pivoted to the bearing member, pressure receiving contact means disposed on said member; means whereby said control member may be moved a limited extent to adjust its pressure receiving contact means to one side or the other of a plane normal to the race axis and intersecting the roller center, said means comprising a device contacting with the roller and adapted to move said pressure receiving contact means of the control member in one direction or the other in accordance with the direction of rotation of the roller.

23. A combination as defined in claim 22 in which said control member comprises a yoke, the limbs of which are pivoted to the bearing member and unite radially outward of the perimeter of the roller, and a friction device disposed between one limb of the yoke and the adjacent face of the roller.

24. A combination as defined in claim 22 in which said control member comprises a yoke, the limbs of which unite radially outward of the perimeter of the roller, a friction device disposed between one limb of the yoke and the adjacent face of the roller, and means for increasing the pressure of the friction devices on the roller as the yoke moves toward the plane normal to the race axis and including the roller center.

25. A combination as defined in claim 22 in which said control member comprises a yoke, the limbs of which unite radially outward of the perimeter of the roller, one of said limbs having an offset inner surface adjacent its inner end, a concave curved surface, slanting in a radial plane, at the junction of the offset surface with the remainder of said limb, a convex curved surface on the bearing member opposed to said concave surface on the limb of the control member, the convex surface on the bearing member being formed on a shorter radius than that on the limb of the control member, a friction pad having lost motion connection with said last named limb, spaced stops on said pad, and a ball disposed between said stops on the pad and said opposed curved surfaces.

26. A combination as defined in claim 22, in in which said control member comprises a yoke, the limbs of which unite radially outward of the perimeter of the roller, one of said limbs having an offset inner surface adjacent its inner end, a concave curved surface slanting in a radial plane at the junction of the offset surface with the remainder of the limb, a convex curved surface on the bearing member opposed to said concave surface on the limb, the convex curved surface on the limb being formed on a longer radius than that of the convex surface on the bearing member, a friction pad having a lost motion connection with said last named limb, spaced stops on said pad, oppositely disposed springs secured to the bearing member and a ball disposed between said springs, said stops on the pad, and said opposed curved surfaces.

27. In frictional power transmitting mechanism, co-axial races having toroidal raceways; a friction roller in tractive engagement with said raceways; supporting means for the roller including a tiltable and inclinable bearing member; a control member pivoted to the bearing member; means whereby said control member may be moved a limited extent to one side or the other of a plane normal to the race axis and including the roller center; a parallel-sided platen on said control member disposed radially outward beyond the perimeter of the roller; contact projections on opposite sides of the platen, actuating means for inclining said control member including a rock shaft; a rock arm extending across the axis of the rock shaft in opposite directions; said rock arm having spaced parallel surfaces embracing said platen and pressure receiving projection, and the axis of said rock arm being disposed between the limits of movement of said control member pressure receiving projections to one side or the other of said plane normal to the race axis and including the roller center.

28. In frictional power transmitting mechanism including coaxial races having toroidal raceways, means for driving one of said races, a friction roller in tractive engagement with said raceways, means for supporting said roller so that it may rotate to transmit torque from the driving race and tilt to change its ratio position, means attached to the roller supporting means adapted to be moved in order to effect ratio change, an actuator for said last named means, means for positively limiting the rate of ratio change effected by said actuator, a governor responsive to the speed of the means for driving one of said races and yieldable elastic connections from the governor to said actuator.

29. A combination as defined in claim 28, in further combination with a manually controllable means operable independently of the governor to effect ratio change.

30. A combination as defined in claim 28, in further combination with a manually controllable means operatively joined to the connections from the governor to the actuator, a damping device, control connections from the damping device arranged to prevent undue rate of movement of the manually controllable means.

31. A combination as defined in claim 28, in which the governor comprises centrifugal elements and a sliding sleeve controlled thereby, a bell crank lever actuated by the sleeve, and an elastic link connection between the bell crank lever and said actuator, a pivoted fulcrum member to which the bell crank lever is fulcrumed at one side of the pivotal axis of said member, and a manual control device adapted to rock the fulcrum member.

32. A combination as defined in claim 28, in which the governor comprises centrifugal elements and a sleeve operated thereby, a bell crank lever operated by the sleeve, an elastic link connecting the lever to said actuator, a pivoted fulcrum to which said lever is fulcrumed at one side of the pivotal axis of said member, a dashpot, and connections between the dashpot and said fulcrum member.

33. In frictional power transmitting mechanism, a prime mover mechanism; coaxial driving and driven races having toroidal raceways; tiltable friction rollers mounted in tractive engagement with the raceways; a speed responsive governor and means for operating it, said governor including centrifugal devices, a sleeve controlled thereby, a governor actuated lever operated by the sleeve, means connected with one of the rollers whereby its tilt position may be affected by externally applied force, an elastic link connected to said lever and said last named means, a pivoted fulcrum member having an arm on which said governor lever is fulcrumed, and manually operated means for controlling the fulcrum member.

34. In friction power transmitting mechanism, a housing; a shaft journaled therein; a race secured to said shaft; a bearing sleeve surrounding and spaced from said shaft so as to be free from bearing pressure exerted by the shaft; means for fixing the bearing sleeve to the housing; a race mounted on said sleeve; friction rollers in tractive engagement with said races; a tube surrounding the shaft and spaced therefrom within the bearing sleeve; arms on said tube; bearings on the arms for said friction rollers, said arms having oil conduits connecting the bearings to the space between the tube and the shaft, means for sealing the ends of the tube; an oil pump, and a conduit connecting the delivery side of the pump with the space between the tube and shaft.

35. In friction power transmitting mechanism, a housing, a shaft journaled therein; a race secured to said shaft; a bearing sleeve surrounding and spaced from said shaft; means for fixing the bearing sleeve to the housing; a race mounted on said sleeve; a tube surrounding the shaft and spaced therefrom within the bearing sleeve; arms on said tube; bearings on the arms; friction rollers journaled on said bearings in tractive engagement with the races; an oil conduit extending radially from the space within said tube; jet pipes in communication with said radial conduit, said jet pipes disposed in position to eject oil on the raceways, an oil pump and a conduit connecting the delivery side of the pump with the space between the tube and shaft and means for sealing the space between the ends of the tube and the shaft.

36. A combination as defined in claim 35, in which the tube surrounding the shaft floats transversely and radially disposed dashpots center the floating tube, there being jet pipes projecting from at least one of said dashpots for ejecting oil upon the raceways.

37. A combination as defined in claim 35 in which the tube surrounding the shaft floats endwise, and the sealing means includes dashpots having spring pressed plungers arranged to exert elastic pressure upon opposite ends of the tube.

38. In frictional power transmitting mechanism, the combination of a housing, a frictional power transmitting unit therein comprising driving and driven races with interposed friction rollers, means for driving said frictional power transmitting unit provided with devices for coupling and uncoupling said means and said unit, a governor disposed within the housing and means for driving it by the means which drives the frictional power transmitting unit, said governor comprising a shaft and centrifugal elements, said shaft having a duct extending thru it to admit oil and discharge it upon the centrifugal elements, a lubricating pump disposed within the housing and conduits connecting the pressure side of the pump with the duct in said governor shaft and with the friction power transmitting unit.

39. In frictional power transmitting mechanism, comprising toroidal driving and driven races and a plurality of interposed tiltable friction rollers, one of said rollers being a master roller, means for rotating the driving race in either normal forward or reverse direction, external means for adjusting the ratio position of the master roller, and means operated by the master roller adapted to cause a ratio change in either direction of rotation to high or low speed ratio position in response to the same direction of movement of said external means.

40. In frictional power transmitting mechanism, a housing, coaxial races having toroidal raceways, a friction roller in tractive engagement with said raceways, supporting means for the roller including a tiltable and inclinable bearing member, a control member attached to the bearing member for inclining it, said control member having external pressure receiving means disposed radially outward of the perimeter of the roller in the plane of rotation of the roller and adjustable to one side or the other of the normal tilt axis of the roller and means including an actuating member mounted on the housing engageable with said pressure receiving means in either of its adjusted positions.

41. In frictional power transmitting mechanism, coaxial races having toroidal raceways; a controlling friction roller in tractive engagement with said raceways; supporting means for the roller including a tiltable and inclinable bearing member; a control member attached to the bearing member, said control member having an external pressure receiving bearing disposed radially outward of the roller perimeter and in the roller perimeter approaching quadrant between a plane normal to the race axis including the roller center and the plane of rotation of that race toward which points in the approaching quadrant of the roller are moving, and an actuating lever engaging said pressure receiving bearing on the control member other rollers in engagement with the raceways, and other means whereby the change in ratio position of said controlling roller changes the ratio position of the other rollers.

42. In power transmitting mechanism, a race, a friction roller maintained in tractive engagement with the race and adjustable in position to vary its path of contact with the race, externally controlled means for varying the path of contact of the roller with the race, and means to regulate the rate of adjusting movement of the roller in varying its path of contact with the race independently of the movement of said externally controlled means.

43. In power transmitting mechanism, a race, a friction roller maintained in tractive engagement with the race and adjustable in position to vary its path of contact with the race, externally controlled means for varying the path of contact of the roller with the race, said externally controlled means including a yieldable device connected to the roller, and means to regulate the rate of the adjusting movement of the roller in varying its path of contact with the race independently of the movement of said externally controlled means.

44. In friction power transmitting mechanism, a combination of a race having a toroidal raceway, a friction roller having its axis of power transmitting rotation lying normally in a radial plane including the axis of the race, a support for the roller constructed and arranged to permit the roller to tilt in order to vary its path of contact with the raceway, and also to incline so as to temporarily move its axis of power transmitting rotation out of said radial plane, means for maintaining adequate tractive engagement of race and roller, an arm operative to incline said roller adapted to occupy a position within the approaching quadrant of roller and raceway, and means to apply force to said arm at a point radially beyond the roller periphery in said approaching quadrant to incline said roller and hold it temporarily inclined and thereby provide a restoration axis slanting with respect to the plane of rotation of the race around which the roller may tilt.

45. In power transmitting mechanism, a frictional power transmitting unit comprising driving and driven members including two opposed toroidal races and an intermediate toroidal race in axial alinement, tiltable rollers in tractive engagement with said races for transmitting power between the opposed races and the intermediate race at different ratios, one of said rollers being inclinable; means for establishing for said inclinable roller an axis of tilt oblique to a plane normal to the race axis and including the roller center, means for shifting the obliquity of the axis of tilt from one side to the other of said plane in response to reversal of the direction of rotation of said inclinable roller, means responsive to torque reaction on the inclinable roller for correspondingly adjusting the ratio position of the other rollers and means capable of operating the driving member in forward or reverse senses of rotation.

46. In friction power transmitting mechanism, a plurality of races; a plurality of rollers in tractive engagement with said races; one of said rollers being a master roller; means connected to the master roller adapted to be actuated by externally applied force for inducing a change of ratio position of the master roller relative to the others; and other means responsive to variation in position and torque reaction of the master roller whereby the change in the ratio position thereof changes the ratio position of the other rollers.

47. In frictional power transmitting mechanism, a shaft; opposed connected races coaxial therewith in driving connection with the shaft, and incapable of relative rotation but capable of a relative axial approaching movement, an intermediate race concentric with and rotatable with respect to the shaft and opposed races, transmission rollers in tractive engagement with said opposed and intermediate races, a thrust receiving member on the shaft, means providing for a limited relative angular movement between the thrust receiving member and said opposed connected races, and torque loading means disposed between the thrust receiving member and one of the opposed races adapted and arranged to force the opposed races toward one another in response to increasing torque.

48. In frictional power transmitting mechanism, a shaft; two races coaxial therewith in positive driving connection with said shaft but capable of relative axial movement with respect to one another; an independently rotatable race disposed between and coaxial with said two races; friction rollers in tractive engagement with said races; a thrust receiving member at one end of the shaft mounted to be capable of limited angular movement thereon; a thrust bearing for said member; torque loading means disposed between the member and the back of one of the races that is in positive driving connection with the shaft and adapted to resolve a limited relative angular movement of the shaft and member into two forces one of which is directed axially against the adjacent race.

49. In frictional power transmitting mechanism, a shaft; two races coaxial therewith in positive driving connection with the shaft but capable of relative axial movement, an independently rotatable race disposed between and coaxial with said two races; friction rollers in tractive engagement with said races; a thrust receiving member at one end of said shaft capable of limited angular movement thereon; a thrust bearing for said member; torque loading means disposed between the member and the back of one of the races in driving connection with the shaft, said torque loading means comprising cam surfaces on the back of the race, coacting cam surfaces torsionally rigid with the thrust receiving member and rollers disposed between the cam surfaces of the race and torque receiving member.

50. The combination as defined in claim 49 associated with a spacing thrust element rotatable with the thrust receiving member disposed between said thrust receiving member and adjacent race, a driving connection between the thrust receiving member and the spacing thrust element, cam surfaces on the spacing thrust element cooperating with the cam surfaces on the race, and rollers disposed between the cam surfaces of the spacing thrust element and race.

51. In frictional power transmitting mechanism, a shaft; two races coaxial and in driving connection therewith, one of said races being sleeved on said shaft and provided on its back with cam surfaces and with radial grooves and ribs; an intermediate race concentric with and independent of the shaft; friction rollers in tractive engagement with said races; a collar keyed to the shaft adjacent the back of the race that is sleeved on the shaft; said collar having torque loading roller seats therethrough and radial ribs and grooves adapted to interlock with the corresponding grooves and ribs on said last named race; a thrust receiving member capable of limited angular movement on the shaft; a thrust bearing for the member; a spacing thrust collar interlocked with said member and having cam surfaces opposed to those on the race, and torque loading rollers disposed in the seats of said collar that is keyed to the shaft between the cam surfaces on said race and on said spacing thrust collar.

52. In frictional power transmitting mechanism, the combination of a housing, a shaft journaled therein capable of slight axial movement; spaced apart races in positive driving connection with said shaft so that there can be no relative angular movement between said shaft and races, but one of said races being capable of axial movement on the shaft; a central race coaxial with and rotatable with respect to said shaft disposed between the first named two races; friction rollers in tractive engagement with said races; a thrust receiving member having a limited angular movement on the shaft; a thrust bearing for said member; means disposed between the thrust receiving member and the back of that race which is capable of axial movement on the shaft for resolving any relative angular movement of the thrust receiving member and shaft into two forces one of which is directed axially against the last-named race.

53. In frictional power transmitting mechanism, a shaft; two independently rotatable races coaxial therewith; intermediate friction rollers having tractive engagement with said races; means for securing one of said races to the shaft so that it must rotate therewith but may slide axially thereon; means for resisting axial movement of the other race away from the race that is secured on the shaft; a collar to rotate with the shaft adjacent the back of the race rotatively fixed to the shaft, a thrust device on the shaft for resisting axial movement of the collar away from the race, an annular plate spring having its inner zone bearing on the collar and having its outer zone bearing against an outer zone on the back of the last-named race.

54. A combination as defined in claim 53 in which said thrust device comprises an adjusting nut threaded on the shaft and bearing axially against said collar.

55. In frictional power transmitting mechanism, a shaft; independently rotatable races coaxial therewith; friction rollers in tractive engagement with said races; means for resisting movement of one of the races away from the other; means for securing one of said races to the shaft so that it must rotate therewith but may slide axially thereon; a collar on the shaft adjacent the back of the last named race, said collar having torque loading roller seats therethrough and an annular spring abutment; a thrust device arranged to resist axial movement of said collar away from the race; thrust receiving means on the shaft; cooperating cam surfaces on the back of the last named race and in front of the thrust receiving means; torque loading rollers disposed in the seats formed in said collar and arranged to cooperate with said cam surfaces, and an annular plate spring having its inner zone bearing against said annular spring abutment on the collar and its outer zone bearing against said outer zone of the last named race.

56. In frictional power transmitting mechanism, the combination of coaxial spaced apart races having toroidal raceways, an intermediate roller engaging said raceways, an inclinable and tiltable mounting for said roller, an external control means for inclining said mounting, said external control means being arranged to be effective on the roller mounting at a point removed from the center of inclination thereof, the line between said center of inclination and the point of application of the external control means determining the axis of tilt.

57. In power transmitting mechanism, the combination of coaxial spaced apart races having toroidal raceways, an interposed roller engaging said raceways, an inclinable and tiltable roller mounting, an arm on said mounting whereby said mounting and roller may be inclined, and external control means connected to said arm, the line between the point of connection of the external control means to said arm and the center of inclination of said mounting being oblique to a plane normal to the race axis.

58. In power transmitting mechanism, the combination of coaxial spaced apart races having toroidal raceways, an interposed roller engaging said raceways, an inclinable and tiltable mounting for said roller, an arm inclinable and tiltable with the mounting but movable angularly in a plane parallel with the plane of rotation of the roller into opposite angular positions with respect to a plane normal to the race axis, said arm extending radially beyond the tread of the roller, means for shifting said arm angularly in response to a reversal of direction of rotation of said roller, and control means constructed and arranged to engage said arm beyond the roller tread in either angular position.

59. A power transmission mechanism comprising a plurality of races, rolling bodies between said races and in tractive contact therewith, whereby power will be transmitted from one race to the other, one of said rolling bodies being a master roller adapted for manual control so as to tilt the axis of rotation thereof for varying the ratio of power transmission, manual control means for effecting such tilting of the master roller, the other of said rolling bodies being follower rollers mounted so as to be adapted for control by the tilting of the master roller to have their axes of rotation tilted for varying the ratio of power transmission, and means independent of said manual control means for tilting said follower rollers in sympathy with said master roller after the master roller is tilted by said control means, and means for distributing the power transmitted by the rollers among them in a predetermined ratio.

JOHN O. ALMEN.
JACOB EHRLICH.